US012313985B2

(12) United States Patent
Liu et al.

(10) Patent No.: US 12,313,985 B2
(45) Date of Patent: May 27, 2025

(54) DEVELOPING CARTRIDGE

(71) Applicant: JIANGXI YIBO E-TECH CO. LTD., Xinyu (CN)

(72) Inventors: Xiaobing Liu, Xinyu (CN); Liangliang Hu, Xinyu (CN); Shiping Ao, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 18/614,106

(22) Filed: Mar. 22, 2024

(65) Prior Publication Data

US 2024/0231255 A1 Jul. 11, 2024

Related U.S. Application Data

(63) Continuation of application No. PCT/CN2022/121146, filed on Sep. 24, 2022.

(30) Foreign Application Priority Data

Sep. 25, 2021 (CN) ......................... 202122322920.3
Sep. 27, 2021 (CN) ......................... 202122350362.1
(Continued)

(51) Int. Cl.
*G03G 15/00* (2006.01)
*G03G 15/08* (2006.01)
*G03G 21/16* (2006.01)

(52) U.S. Cl.
CPC ..... *G03G 15/0808* (2013.01); *G03G 15/0812* (2013.01); *G03G 15/0875* (2013.01);
(Continued)

(58) Field of Classification Search
CPC ........... G03G 15/0808; G03G 15/0812; G03G 15/0875; G03G 15/0889
(Continued)

(56) References Cited

U.S. PATENT DOCUMENTS 7,970,315 B2 † 6/2011 Sato
8,238,800 B2 8/2012 Hatano
(Continued)

FOREIGN PATENT DOCUMENTS

CN 1154497 A 7/1997
CN 201859307 U 6/2011
(Continued)

*Primary Examiner* — Hoan H Tran
(74) *Attorney, Agent, or Firm* — IPro, PLLC

(57) ABSTRACT

Disclosed herein is a developing cartridge. The developing cartridge, including: a housing; a developer roller extending in a first direction and at a front end of the housing in a second direction intersecting the first direction; an agitator; an input gear at a first end of the housing in the first direction; a developer roller gear at one end of the developer roller and configured to cause the developer roller to rotate; an agitator gear at one end of the agitator and configured to cause the agitator to rotate; at least two transmission gears connected between the input gear and the developer roller gear, wherein one of the at least two transmission gears contacts and meshes with the input gear; an agitator transmission gear is configured to transmit driving force to the agitator gear, wherein the agitator transmission gear contacts and meshes with the input gear.

27 Claims, 15 Drawing Sheets

(30) Foreign Application Priority Data

| | | |
|---|---|---|
| Nov. 5, 2021 | (CN) | 202122691473.9 |
| Mar. 28, 2022 | (CN) | 202220688926.4 |

(52) U.S. Cl.
CPC ..... *G03G 15/0889* (2013.01); *G03G 15/0896* (2013.01); *G03G 21/1652* (2013.01)

(58) Field of Classification Search
USPC .......................................... 399/107, 110, 111
See application file for complete search history.

(56) References Cited

U.S. PATENT DOCUMENTS

| | | | | |
|---|---|---|---|---|
| 8,503,906 | B2 | 8/2013 | Suzuki et al. | |
| 9,176,428 | B2 † | 11/2015 | Mori | |
| 9,904,237 | B2 | 2/2018 | Abe et al. | |
| 10,048,616 | B2 * | 8/2018 | Shimizu | G03G 15/0896 |
| 10,691,062 | B1 * | 6/2020 | Amann | G03G 21/1867 |
| 11,513,452 | B2 † | 11/2022 | Itabashi | |
| 2018/0321637 | A1 | 11/2018 | Sato et al. | |

FOREIGN PATENT DOCUMENTS

| | | | |
|---|---|---|---|
| CN | 102425643 | A | 4/2012 |
| CN | 203299519 | U | 11/2013 |
| CN | 203673233 | U | 6/2014 |
| CN | 102955394 | B | 7/2014 |
| CN | 104516236 | A | 4/2015 |
| CN | 205450563 | U | 8/2016 |
| CN | 206002842 | U | 3/2017 |
| CN | 212905904 | U | 4/2021 |
| JP | 2017181845 | * | 10/2017 |
| JP | 2018067009 | A | 4/2018 |

* cited by examiner
† cited by third party

DEVELOPING CARTRIDGE

TECHNICAL FIELD

The present application relates to a developing cartridge that is detachably mounted in an image forming device, wherein the image forming device is an electrophotographic image forming device.

BACKGROUND

Electrophotographic image forming devices such as laser printers and LED printers have been developed. A developing cartridge is used in the image forming device. The developing cartridge includes a developer roller for supplying developer.

A conventional developing cartridge is mounted on a drum cartridge. The drum cartridge includes a photosensitive drum. When the developing cartridge is mounted on the drum cartridge, the photosensitive drum comes into contact with the developer roller. Thereafter, the drum cartridge with the developing cartridge mounted therein is mounted in an image forming device.

The developing cartridge includes a component for positioning the developer roller relative to the photosensitive drum. The development cartridge further includes a developing electrode for providing an electrical bias to a shaft of the development roller. In addition, the developing cartridge includes a component that receives pressure when the developer roller is separated from the photosensitive drum. However, if the component for positioning the developer roller, the developing electrode for providing the bias to the shaft of the developer roller, and the component for receiving pressure upon separation are separately provided, the number of components increases in the developing cartridge.

SUMMARY

The present application further develops the prior art. On the one hand, the present application provides a structure capable of reducing the number of components in the developing cartridge. Another aspect of the present application provides a more compact developing cartridge. The present application is realized through the following technical solutions: a developing cartridge, comprising: a housing; a developer roller extending in a first direction and at a front end of the housing in a second direction intersecting the first direction; an agitator; an input gear at a first end of the housing in the first direction; a developer roller gear at one end of the developer roller and configured to cause the developer roller to rotate; an agitator gear at one end of the agitator and configured to cause the agitator to rotate; at least two transmission gears connected between the input gear and the developer roller gear, wherein one of the at least two transmission gears contacts and meshes with the input gear; an agitator transmission gear is configured to transmit driving force to the agitator gear, wherein the agitator transmission gear contacts and meshes with the input gear, and in the second direction, a rotational axis of the agitator gear is located between a rotational axis of the agitator transmission gear and a rotational axis of the input gear.

According to this configuration, wherein the input gear covers at least a part of the agitator gear when viewed in the first direction.

According to this configuration, wherein in the second direction, a rotational axis of the developer roller gear, a rotational axis of one of the at least two transmission gears, a rotational axis of the input gear, a rotational axis of the agitator gear, and a rotational axis of the agitator transmission gear are arranged in sequence.

According to this configuration, the number of the at least two transmission gears is an even number.

According to this configuration, further comprising a first bearing component at the first end of the housing, wherein the first bearing component rotatably supports the developer roller, and the first bearing component comprises an input gear support column that supports the input gear and a support column that supports one of the at least two transmission gears.

According to this configuration, further comprising a supply roller, wherein one of the at least two transmission gears is at an end of the supply roller and configured to cause the supply roller to rotate, and another transmission gear of the at least two transmission gears mesh with the developer roller gear.

According to this configuration, further comprising a first protrusion at the first end and a gear cover covering at least a part of the input gear, wherein the first protrusion is configured to receive force from a photosensitive drum cartridge and cause the developer roller to move in a direction away from a photosensitive drum of the photosensitive drum cartridge, and wherein an orthographic projection of the first protrusion in the first direction overlaps at least a part of an orthographic projection of the developer roller gear in the first direction.

According to this configuration, the first protrusion and the gear cover are formed integrally with each other by coinjection molding.

According to this configuration, further comprising a chip unit at the first end of the housing in the first direction, and the chip unit is farther to the front end of the housing than the rotational axis of the agitator gear in the second direction.

According to this configuration, the chip unit comprises a chip and a chip holder supporting the chip, and the chip holder is movable and on the first end of the housing.

According to this configuration, wherein the developer roller comprises a developer roller shaft, the developer roller shaft has a first diameter part, a second diameter part and a third diameter part, and wherein the first diameter part, the second diameter part and the third diameter part are arranged in sequence in the first direction, and have diameters decreasing in sequence.

According to this configuration, wherein the housing further comprises a second end opposite to the first end in the first direction, wherein the developing cartridge further comprises a second bearing component at the second end of the housing, wherein the second bearing component rotatably supports the development roller shaft, and wherein the second bearing component supports the second diameter part to support the development roller shaft.

On the other hand, another aspect of the present application provides a more compact developing cartridge. A developing cartridge, comprising: a housing; a developer roller extending in a first direction and at a front end of the housing in a second direction intersecting the first direction; an agitator; an input gear at a first end of the housing in the first direction; a developer roller gear at one end of the developer roller and configured to cause the developer roller to rotate; an agitator gear at one end of the agitator and configured to cause the agitator to rotate; at least two transmission gears connected between the input gear and the developer roller gear, wherein one of the at least two transmission gears contacts and meshes with the input gear; a lever at a second end opposite to the first end of the housing in the first direction, the lever being movable relative to the housing; and a locked protrusion at the second end in the first direction, the locked protrusion being configured to allow a photosensitive drum cartridge to lock the developing cartridge; wherein at least a part of the lever is closer to the front end of the housing than the locked protrusion in the second direction.

According to this configuration, further comprising an electrode and a side cover, wherein the electrode is electrically connected to the developer roller, the electrode is at the second end of the housing, the side cover is mounted on an outer side of the lever to prevent the lever from coming out of the housing, the electrode comprises a side cover limiting groove, and the side cover comprises a limited protrusion configured to be inserted into the side cover limiting groove.

According to this configuration, wherein the housing comprises a developer accommodating chamber, wherein the developer accommodating chamber comprises a first side wall and a second side wall opposite to the first side wall in the first direction, wherein the first side wall is at the first end of the housing, wherein a developer filling port is on the second side wall, wherein a sealing cover is mounted on the powder filling port and configured to prevent developer from leaking from the developer accommodating chamber, and wherein an orthographic projection of at least a part of the locked protrusion in the first direction overlaps at least a part of an orthographic projection of the sealing cover in the first direction.

According to this configuration, further comprising a first protrusion at the first end, wherein the first protrusion is configured to receive force from the photosensitive drum cartridge and cause the developer roller to move in a direction away from a photosensitive drum of the photosensitive drum cartridge, and wherein an orthographic projection of the first protrusion in the first direction overlaps at least a part of an orthographic projection of the developer roller gear in the first direction.

According to this configuration, further comprising a second protrusion on the second end of the housing, wherein the second protrusion is electrically connected to the developer roller, and wherein at least a part of an orthographic projection of the second protrusion in the first direction overlaps at least a part of an orthographic projection of the first protrusion in the first direction.

According to this configuration, further comprising a first urged protrusion at the first end, wherein the first urged protrusion is configured to contact a pressing component of the photosensitive drum cartridge to receive an urging force to keep the developer roller in contact with a photosensitive drum of the photosensitive drum cartridge, and the first urged protrusion is located at a front end of a rotational axis of the input gear in the second direction.

According to this configuration, further comprising a gear cover at the first end, wherein the gear cover is configured to cover at least a part of the input gear, and the first urged protrusion and the gear cover are formed integrally with each other by coinjection molding.

On the other hand, another aspect of the present application provides a more compact developing cartridge. A developing cartridge, comprising: a housing; a developer roller extending in a first direction and at a front end of the housing in a second direction intersecting the first direction; an agitator; an input gear at a first end of the housing in the first direction; a developer roller gear at one end of the developer roller and configured to cause the developer roller to rotate; and an agitator gear at one end of the agitator and configured to cause the agitator to rotate; at least two transmission gears connected between the input gear and the developer roller gear, wherein one of the at least two transmission gears contacts and meshes with the input gear; and a first urged protrusion that contacts a pressing component of a photosensitive drum cartridge to receive an urging force to keep the developer roller in contact with a photosensitive drum of the photosensitive drum cartridge, and wherein the first urged protrusion is closer to the front end of the housing than a rotational axis of the input gear in the second direction.

According to this configuration, further comprising a gear cover at the first end, wherein the gear cover is configured to cover at least a part of the input gear, and the first urged protrusion and the gear cover are formed integrally with each other by coinjection molding.

According to this configuration, further comprising a first protrusion at the first end, wherein the first protrusion is configured to receive force from the photosensitive drum cartridge and cause the developer roller to move in a direction away from the photosensitive drum, and wherein an orthographic projection of the first protrusion in the first direction overlaps at least a part of an orthographic projection of the developer roller gear in the first direction.

According to this configuration, wherein the housing further comprises a second end opposite to the first end in the first direction, wherein the developing cartridge further comprises a second protrusion on the second end of the housing, wherein the second protrusion is electrically connected to the developer roller, and wherein at least a part of an orthographic projection of the second protrusion in the first direction overlaps at least a part of an orthographic projection of the first protrusion in the first direction.

According to this configuration, further comprising a gear cover at the first end, wherein the gear cover is configured to cover at least a part of the input gear, and wherein the first urged protrusion, the first protrusion and the gear cover are formed integrally with each other by coinjection molding.

According to this configuration, wherein the first protrusion is on an outer side of the first urged protrusion in the first direction.

According to this configuration, the first urged protrusion is between the first protrusion and a rotational axis of the input gear in the second direction.

According to this configuration, further comprising a bearing component and a doctor blade, wherein the bearing component comprises a limiting cavity and a developer roller bearing that rotatably supports the developer roller, wherein the doctor blade comprises a blade and a blade holder that supports the blade, and wherein, in the first direction, the blade holder comprises a lug portion configured to be inserted into the limiting cavity.

DETAILED DESCRIPTION

The embodiments of the present application will be described in detail below with reference to the drawings. It should be understood that specific embodiments described herein are merely used to explain the present application and are not intended to limit the present application.

Hereinafter, a direction in which a developer roller of a developing cartridge extends is referred to as a "first direction". In addition, a direction in which the developer roller and an agitator of the developing cartridge are arranged is referred to as a "second direction". The first direction and the second direction cross each other. Preferably, the first direction and the second direction are orthogonal. A side of a housing on which a developer accommodating chamber is disposed is defined as an inner side of the housing, and a side of the housing opposite to the developer accommodating chamber is defined as an outer side of the housing.

<Overall Structure of Developing Cartridge and Photosensitive Drum Cartridge>

Figure 1:
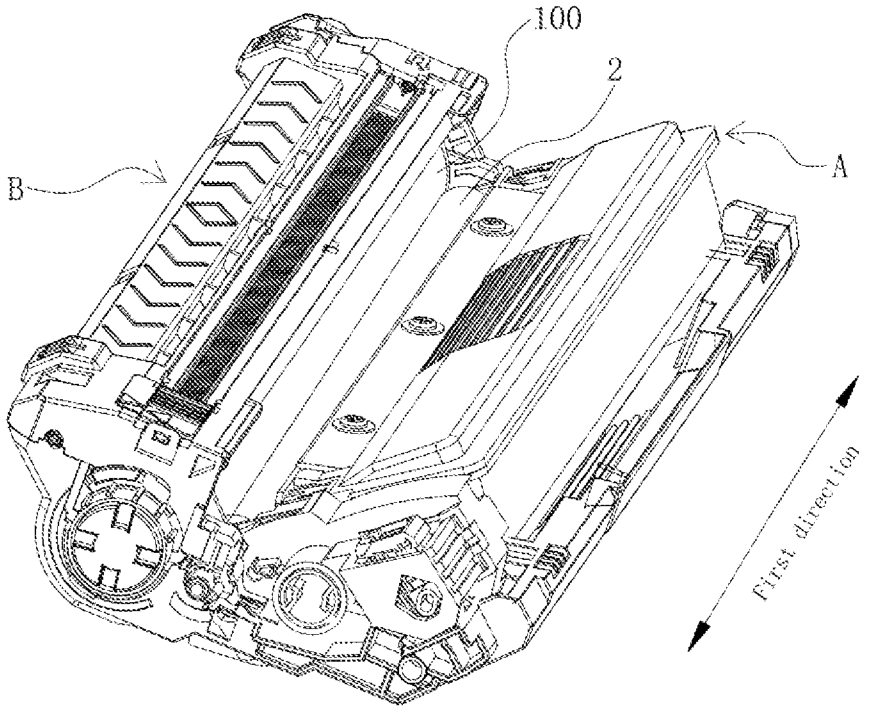
FIG. 1 is a schematic three-dimensional structural view of a developing cartridge provided by the present application which is mounted in a photosensitive drum cartridge.
Figure 2:
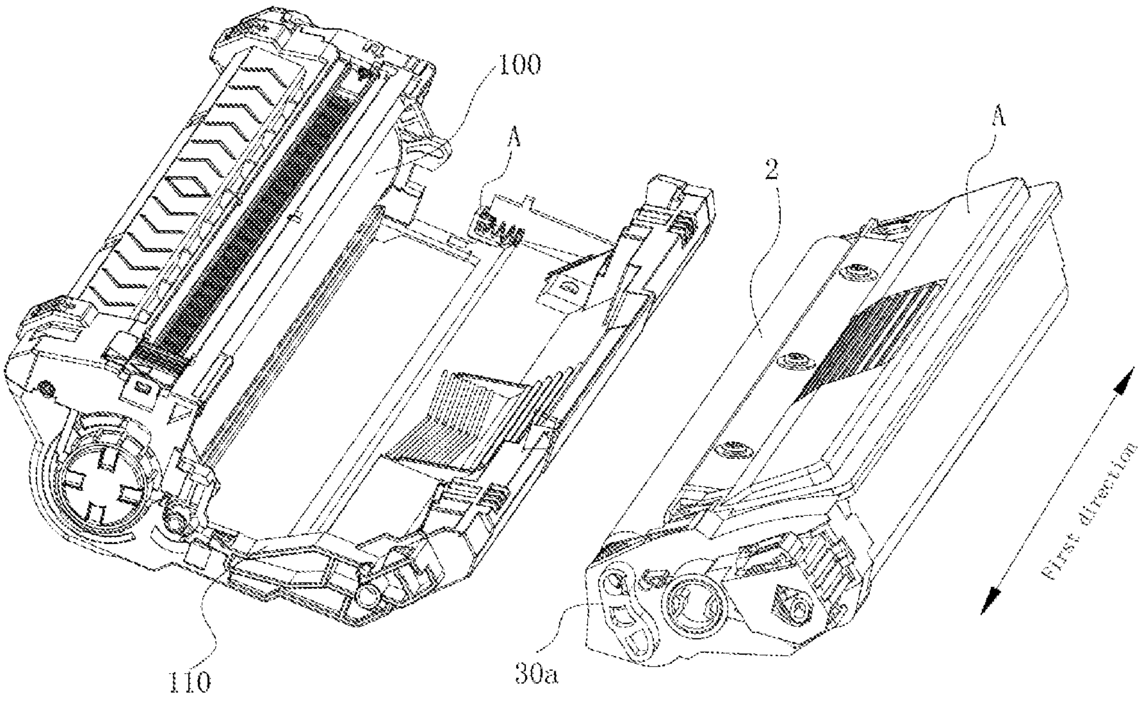
FIG. 2 is a schematic three-dimensional structural view of the developing cartridge provided by the present application which is arranged separately from the photosensitive drum cartridge.

Perspective views of a developing cartridge and a photosensitive drum cartridge are shown in FIGS. 1 and 2. The developing cartridge A may be mounted on the photosensitive drum cartridge B having a photosensitive drum 100. The developing cartridge A and the photosensitive drum cartridge B are used in an image forming device. Examples of the image forming device are laser printers or LED printers.

The developing cartridge A is mounted on the photosensitive drum cartridge B, which is then mounted in the image forming device. Preferably, the image forming device may allow four developing cartridges to be mounted therein. The four developing cartridges contain different colors (such as cyan, magenta, yellow and black) of developer. The image forming device forms an image on a recording side of printing paper by transfer using developer supplied from a developing cartridge. It should be noted that the number of developing cartridges that can be mounted in the image forming device may be one or more. Therefore, in addition to four, it may also be one to three, or five or more.

<Regarding Structure of Developing Cartridge>

Referring to FIGS. 3 to 23, the developing cartridge A includes a housing 1, a developer roller 2, a supply roller 3, an agitator 10, a gear unit, a first protrusion 30 and a second protrusion 40.

The developer roller 2 is a roller that can rotate about an axis of rotation extending in the first direction. The developer roller 2 is located at one end of the housing 1 in the second direction. An end where the developer roller 2 is located is referred to as a front end of the housing 1 in the second direction. A developer roller shaft 2*a* is electrically conductive and is preferably a metal shaft.

The supply roller 3 is a roller that is rotatable about an axis of rotation extending in the first direction.

The housing 1 has a developer accommodating chamber 15 provided inside it. The housing 1 has a first outer surface 101 and a second outer surface 102. The first outer surface 101 is located at one end of the housing in the first direction. The second outer surface 102 is located at the other end of the housing in the first direction. The first outer surface 101 and the second outer surface 102 are separated from each other in the first direction. The housing 1 extends in the first direction between the first outer surface 101 and the second outer surface 102. Furthermore, the housing 1 also extends in the second direction.

The developer accommodating chamber 15 has a first side wall 15*a* and a second side wall 15*b*. The first side wall 15*a* is located at one end of the developer accommodating chamber 15 in the first direction. The second side wall 15*b* is located at the other end of the developer accommodating chamber 15 in the first direction. The first side wall 15*a* and the second side wall 15*b* are separated from each other in the first direction. An outer surface of the first side wall 15*a* forms a part of the first outer surface 101, and an outer surface of the second side wall 15*b* forms a part of the second outer surface 102. The developer accommodating chamber 15 extends along the first direction between the first side wall 15*a* and the second side wall 15*b*. In addition, the developer accommodating chamber 15 extends along the second direction.

The gear unit is located on the first outer surface 101 of the housing 1. The gear unit includes an input gear 21, a supply roller gear 22, a first idler gear (transmission gear) 23, a developer roller gear 24, a second idler gear (agitator transmission gear) 25, and an agitator gear 26. The first idler gear 23 connects the developer roller gear 24 and the supply roller gear 22. Specifically, the first idler gear 23 simultaneously meshes with the developer roller gear 24 and the supply roller gear 22, the input gear 21 contacts and meshes with the supply roller gear 22, the supply roller gear 22 contacts and meshes with the first idler gear 23, and the first idler gear 23 contacts and meshes with the developer roller gear 24. The second idler gear 25 connects the input gear 21 and the agitator gear 26. Specifically, the second idler gear 25 simultaneously meshes with the input gear 21 and the agitator gear 26. In order to make the structure of the developing cartridge in the second direction as compact as possible and reduce the size of the developing cartridge in the second direction, in the second direction, a rotational axis of the agitator gear 26 is located between a rotational axis of the input gear 21 and a rotational axis of the second idler gear 25, and a rotational axis of the first idler gear 23 is located between the rotational axis of the input gear 21 and a rotational axis of the developer roller gear 24. The input gear 21 has a driving force receiving portion 21*b* and an input gear portion 21*a*, and the second idler gear 25 has a first tooth portion 25*a* and a second tooth portion 25*b*, wherein the first tooth portion 25*a* has a diameter larger than that of the second tooth portion 25*b*. In the first direction, the first tooth portion 25*a* is further away from the first outer surface 101 than the second tooth portion 25*b*. In the first direction, the agitator gear 26 is located inside the input gear portion 21 and the first tooth portion 25*a*. In other words, in the first direction, the agitator gear 26 is closer to the first outer surface 101 than both the input gear portion 21*a* and the first tooth portion 25*a*. A gear cover 17 covers the gear unit 20, and the gear cover 17 and the housing 1 together form the entire housing of the developing cartridge. The gear cover 17 is fixed to the first outer surface 101 of the housing by fasteners such as screws. At least one of a plurality of gears is located between the first outer surface 101 and the gear cover 17. In the second direction, the developer roller gear 24, the supply roller gear 22, the input gear 21, and the second idler gear 25 are arranged in sequence. In addition, in the second direction, the developer roller gear 24, the first idler gear 23, the input gear 21, and the second idler gear 25 are also arranged in sequence. A bearing component 16 is mounted at the first outer surface 101. The bearing component 16 rotatably supports the developer roller shaft 2*a* and the supply roller shaft 3*a*. At the same time, the bearing component 16 is also provided with an input gear support column 16*a* that supports the input gear 21, and a first idler gear support column 16*b* that supports the first idler gear 23.

The agitator 10 includes an agitator shaft 11 and a blade 12. The agitator shaft 11 extends in the first direction. The blade 12 extends or expands from the agitator shaft 11 toward the inner surface of the housing 1. The blade 12 and a part of the agitator shaft 11 are provided in the developer accommodating chamber 15 of the housing. The agitator gear 26 in the gear unit 20 is connected to one end of the agitator shaft 11 in the first direction. When the agitator gear 26 rotates, the agitator shaft 11 and the blade 12 rotate about the axis of rotation extending in the first direction. Therefore, the developer is agitated in the developer accommodating chamber 15 by the rotating blade 12.

When the developing cartridge receives a driving force, the developer is supplied from the developer accommodating chamber 15 in the housing 1 to an outer peripheral surface of the developer roller 2 via the supply roller 3. At this time, the developer is frictionally charged between the supply roller 3 and the developer roller 2. In addition, an electrical bias voltage is applied to the developer roller shaft 2*a* of the developer roller 2. Therefore, the developer is attracted to the outer peripheral surface of the developer roller 2.

The gear cover 17 includes a cylindrical shaft collar 17*a* protruding in the first direction. The power receiving portion 21*b* of the input gear 21 is accommodated in the shaft collar 17*a*. The power receiving portion 21*b* has an engaging portion recessed in the first direction. The engagement portion is exposed from the gear cover 17. When the developing cartridge is mounted into the image forming device, a driving shaft of the image forming device may mesh with the engagement portion and drive the input gear 21 to rotate. The driving force is transmitted to the agitator gear 26, the developer roller gear 24 and the supply roller gear 22 through the input gear 21.

The housing 1 has, in the second direction, a rear end opposite the front end where the developer roller 2 is located. A chip unit 60 is provided at the rear end. The chip unit 60 includes a chip holder 61 and a chip holder cover 65. The chip holder cover 65 has a first hole 65*a*. The gear cover 17 has a second hole 17*c*. The chip holder 61 has a first column 62*a* mounted in the first hole 65*a* and a second column 62*b* mounted in the second hole 17*c*. The chip holder 61 is movably supported by the first hole 65*a* and the second hole 17*c*. The chip holder 61 includes a first part 62, a second part 64, and an elastic component 63 located between the first part 62 and the second part 64. The first part 62 is a part for supporting a chip. The second part 64 is mounted in the first part 62 and is movable relative to the first part 62. The elastic component 63 keeps the first part 62 and the second part 64 elastically spread apart.

Figure 3:
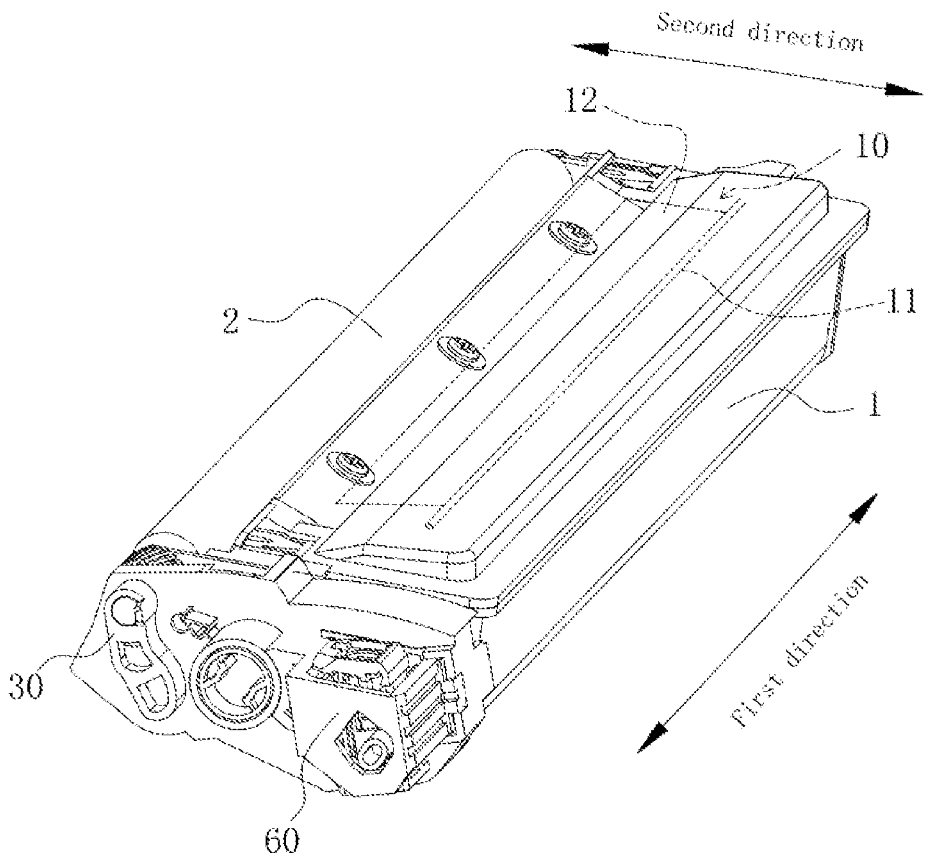
FIG. 3 is a schematic three-dimensional structural view of the developing cartridge provided by the present application viewed from a first outer surface side.
Figure 4:
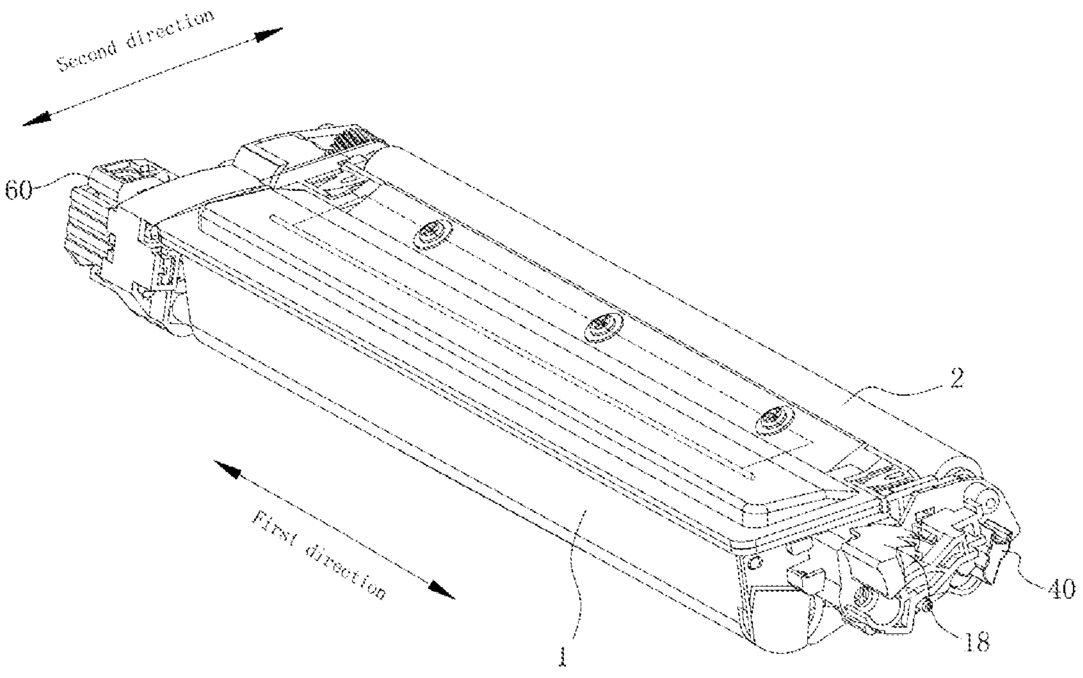
FIG. 4 is a schematic three-dimensional structural view of the developing cartridge provided by the present application viewed from a second outer surface side.
Figure 5:
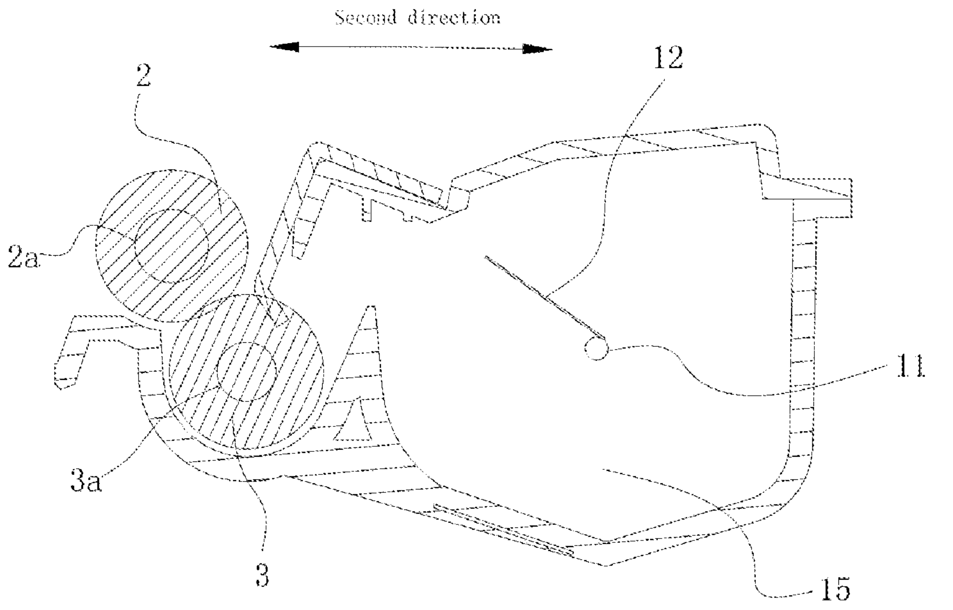
FIG. 5 is a schematic cross-sectional structural view of the developing cartridge provided by the present application.
Figure 6:
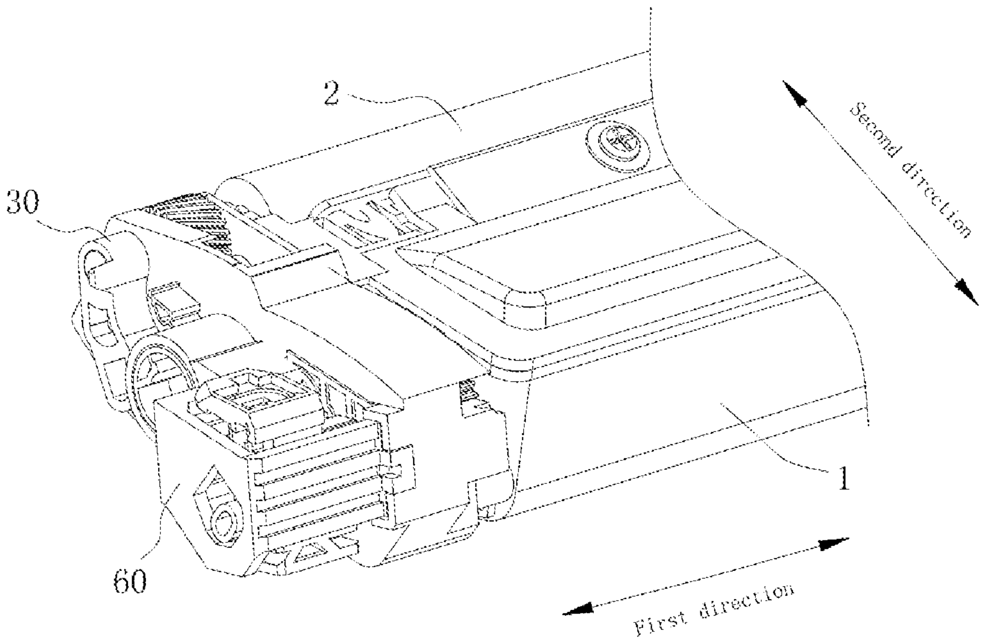
FIG. 6 is a partial structural schematic view of the developing cartridge provided by the present application viewed from the first outer surface side.
Figure 7:
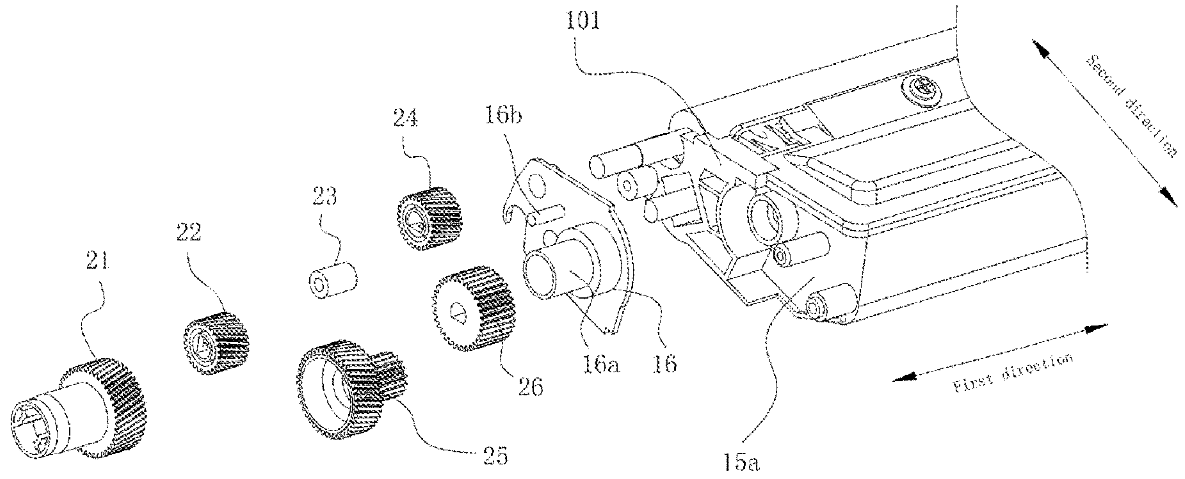
FIG. 7 is an exploded structural schematic view of a gear unit on the first outer surface side of the developing cartridge provided by the present application.
Figure 8:
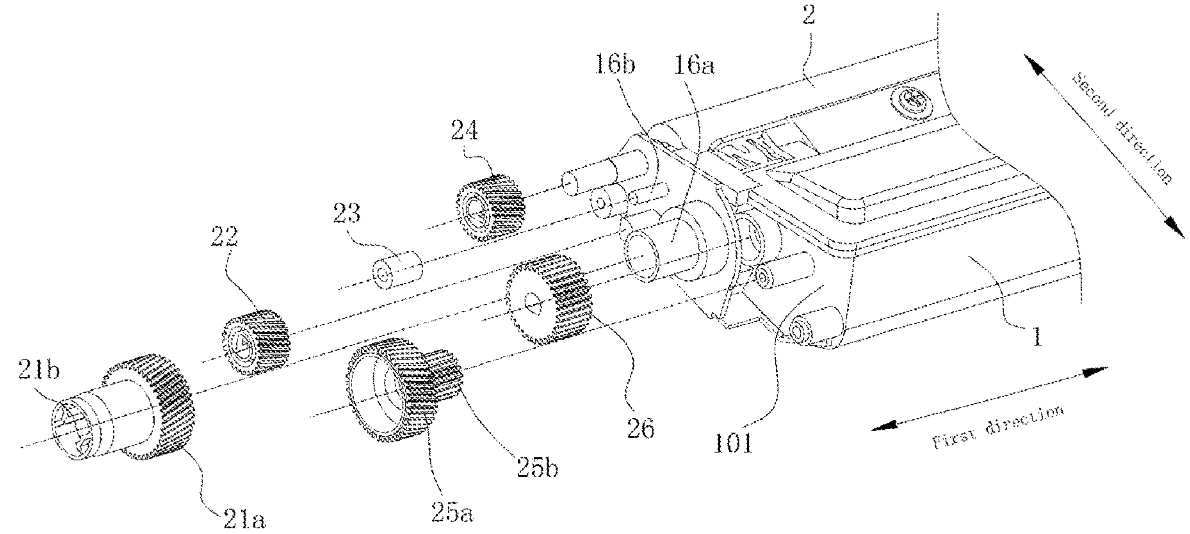
FIG. 8 is an exploded structural schematic view of the gear unit on the first outer surface side of the developing cartridge provided by the present application.
Figure 9:
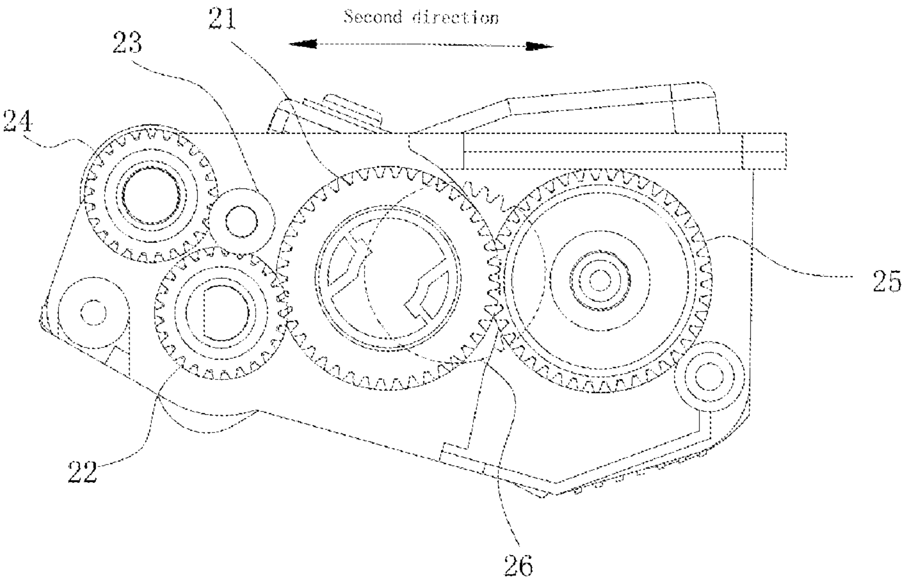
FIG. 9 is a schematic structural view of the developing cartridge provided by the present application viewed along a first direction from the first outer surface side.
Figure 10:
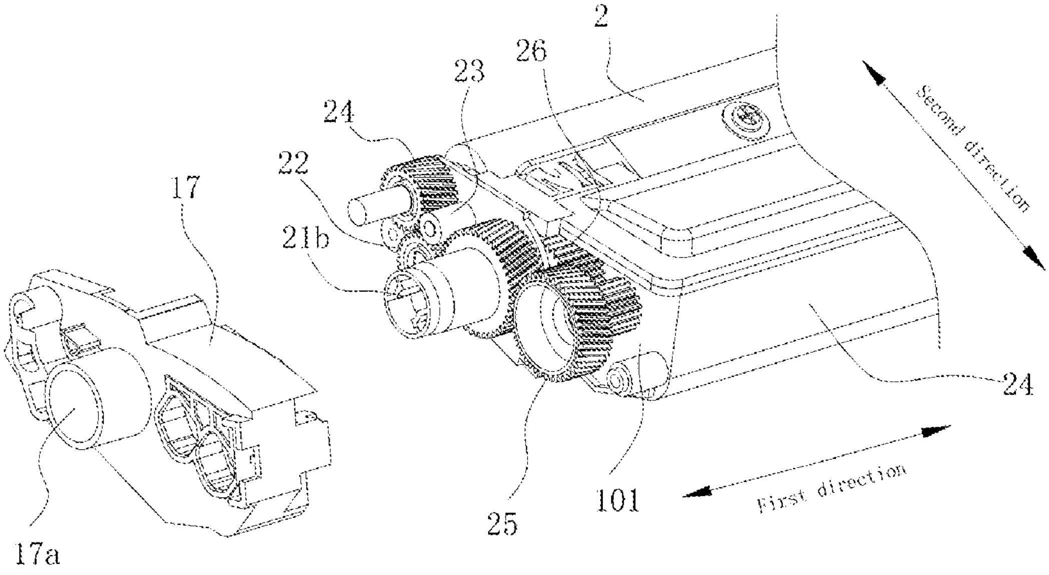
FIG. 10 is a schematic structural view of the developing cartridge provided by the present application in which a gear cover on the first outer surface side is separated.
Figure 11:
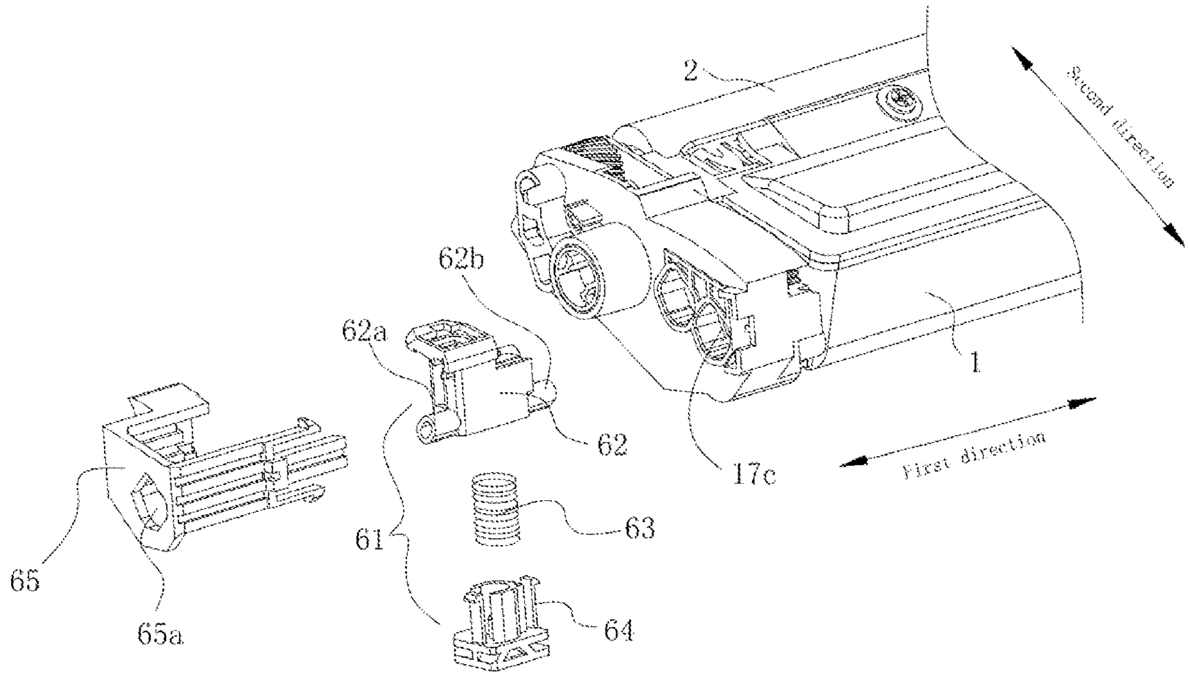
FIG. 11 is an exploded structural schematic view of a chip unit on the first outer surface side of the developing cartridge provided by the present application.
Figure 12:
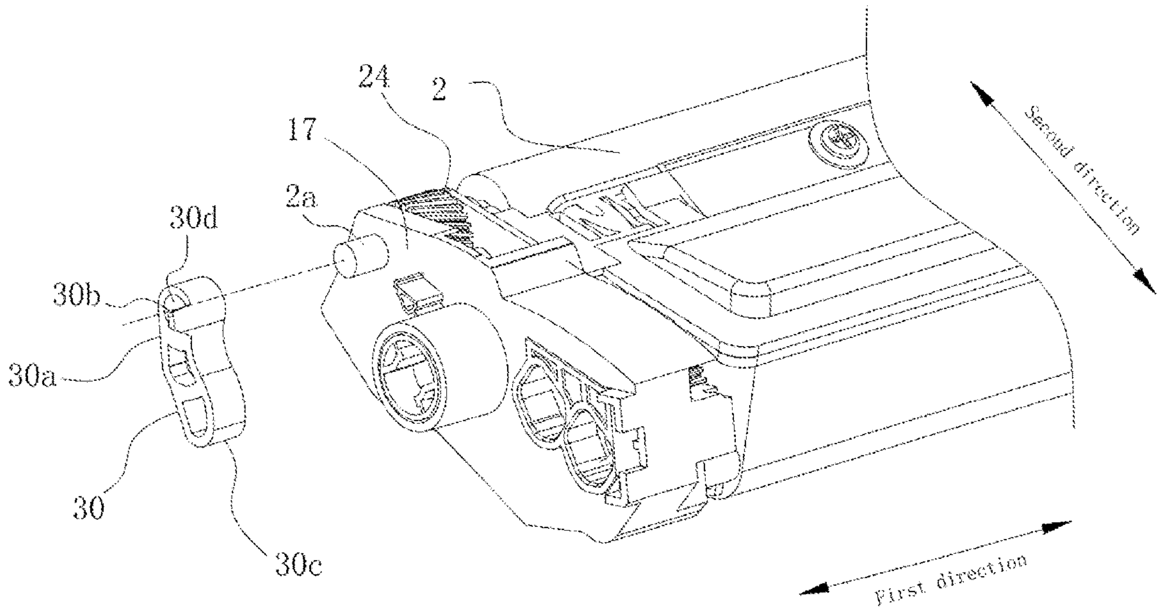
FIG. 12 is a schematic structural view of a first protrusion of the developing cartridge provided by the present application being separated.
Figure 20:
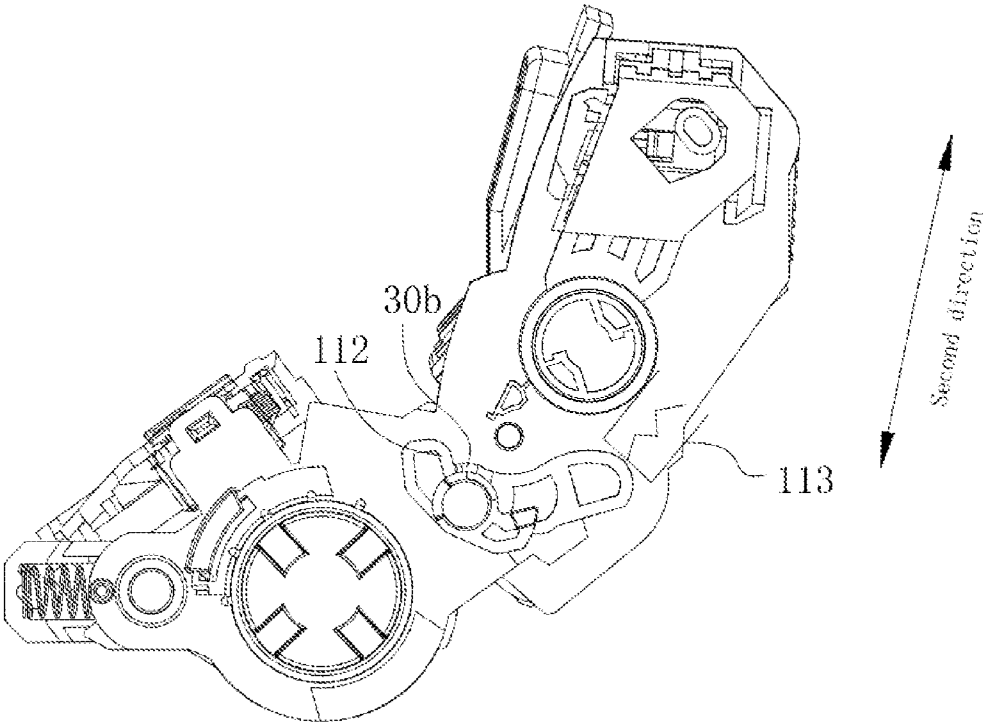
FIG. 20 is a schematic structural view of the developing cartridge provided by the present application which is mounted in the photosensitive drum cartridge, in which a drum roller is in a contact state viewed from the first outer surface side.
Figure 21:
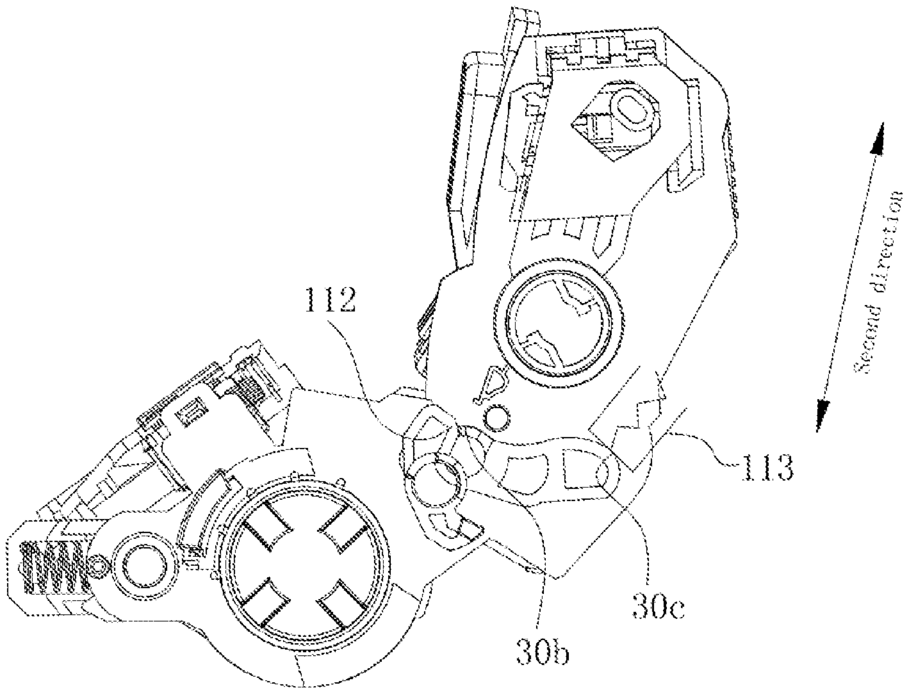
FIG. 21 is a schematic structural view of the developing cartridge provided by the present application which is mounted in the photosensitive drum cartridge, in which the drum roller is in a separated state viewed from the first outer surface side.
Figure 22:
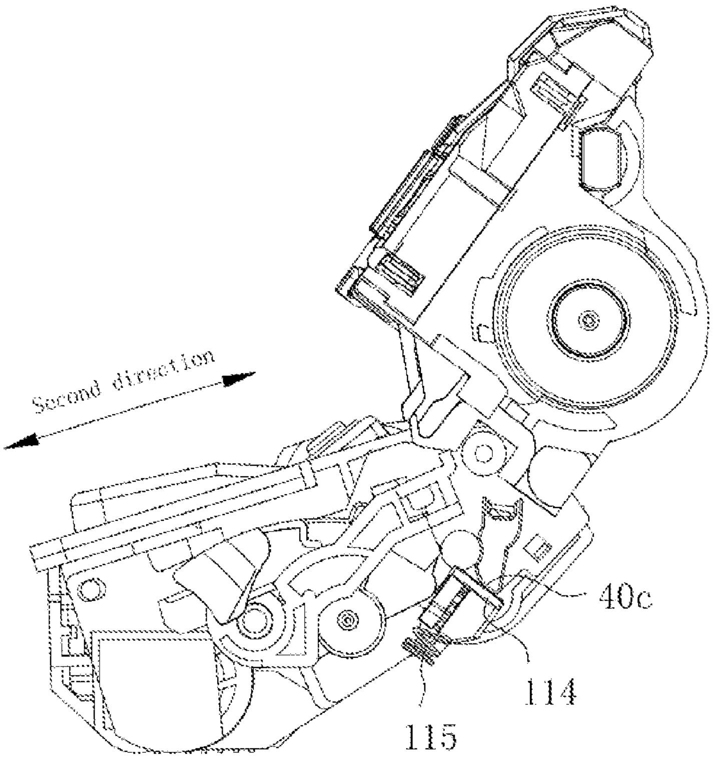
FIG. 22 is a schematic structural view of the developing cartridge provided by the present application which is mounted in the photosensitive drum cartridge, in which the drum roller is in the contact state viewed from the second outer surface side.
Figure 23:
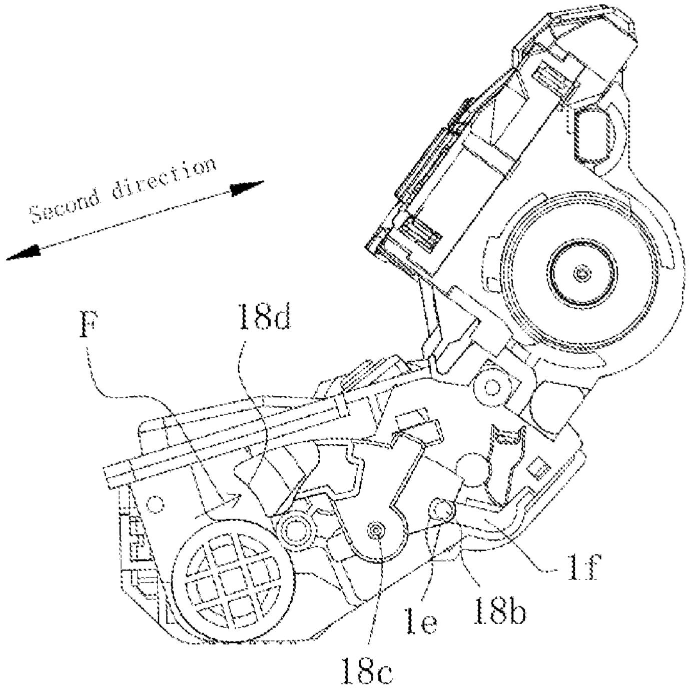
FIG. 23 is a schematic structural view of the developing cartridge provided by the present application which is mounted in the photosensitive drum cartridge, in which the drum roller is in the separated state viewed from the second outer surface side.
Figure 24:
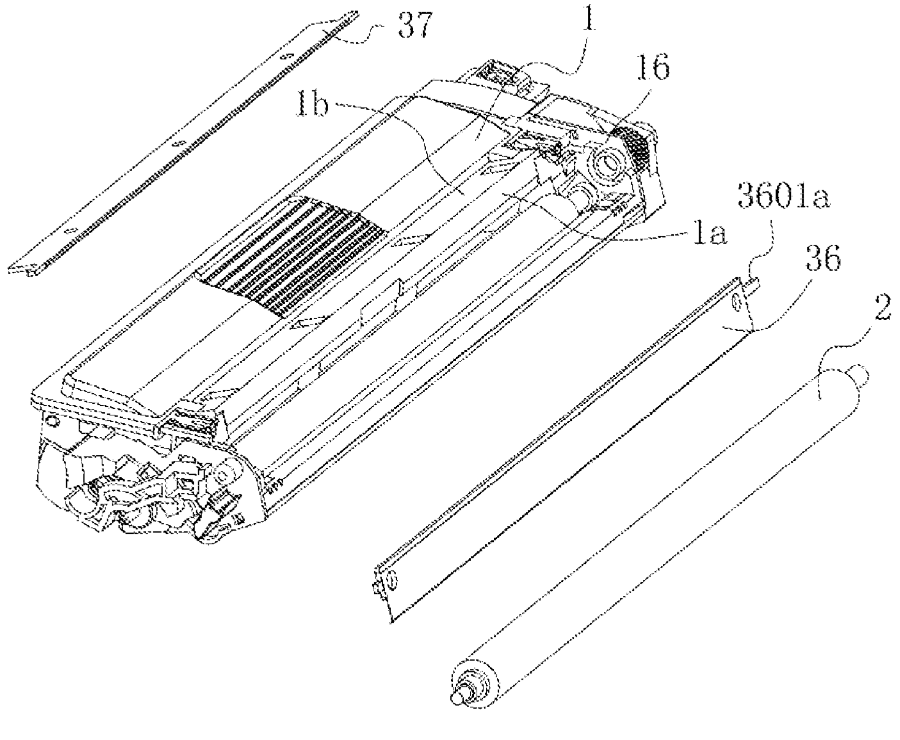
FIG. 24 is a schematic structural view of the developing cartridge provided by the present application in which a doctor blade and a reinforcing metal frame are disassembled from a housing.
Figure 25:
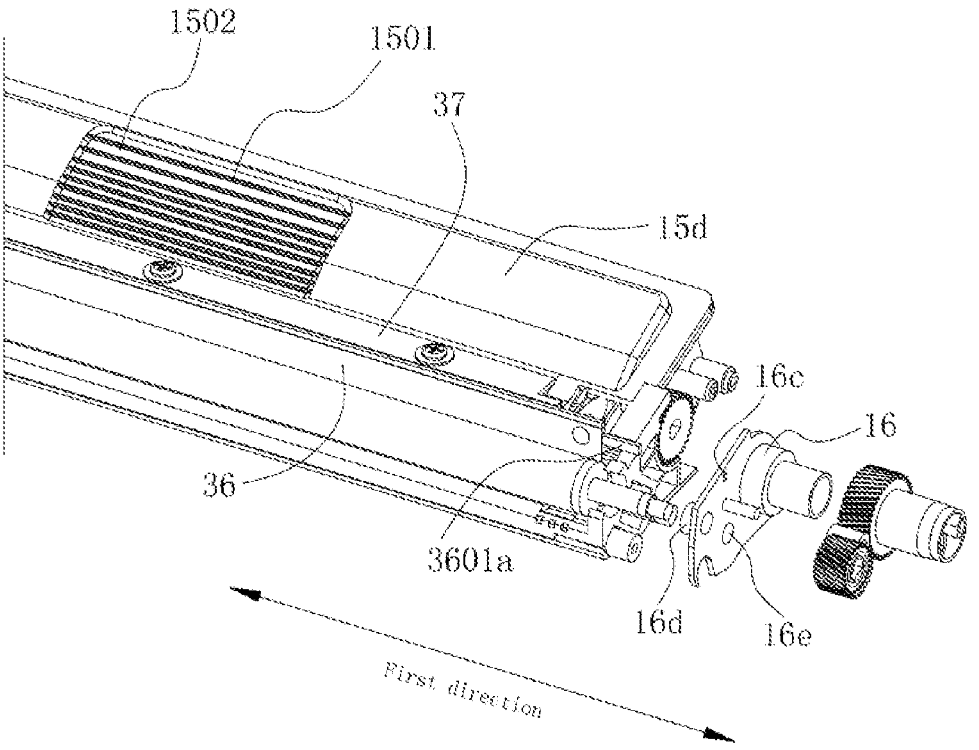
FIG. 25 is a schematic structural view of the developing cartridge provided by the present application in which a bearing component and a gear are disassembled from the housing.
Figure 26:
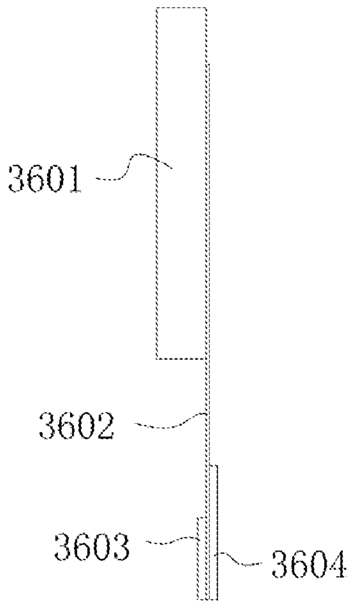
FIG. 26 is a side structural schematic view of the doctor blade of the developing cartridge provided by the present application.
Figure 27:
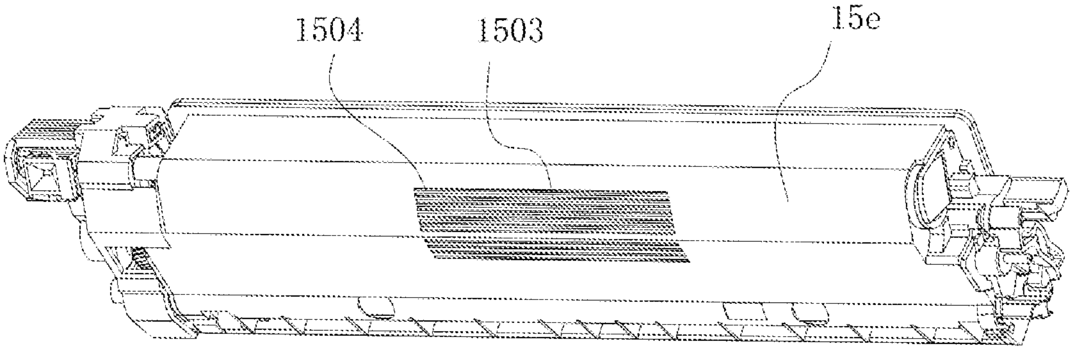
FIG. 27 is a schematic structural view of the development box provided by the present application viewed from a rear side.

The first protrusion 30 is located on the outside of the gear cover 17 of the housing. When projected in the first direction, the first protrusion 30 overlaps at least a part of the developer roller gear 24, and the first protrusion 30 is located on the outside of the gear cover 17. In other words, in the first direction, at least a part of the gear cover 17 is located between the developer roller gear 24 and the first protrusion 30. The first protrusion 30 may be mounted on the gear cover 17, or may be integrally molded with the gear cover 17. The first protrusion 30 further includes a first guide protrusion 30*a*, which cooperates with a first guide support portion 110 of the photosensitive drum cartridge to guide the developing cartridge A for installation. The first protrusion 30 further includes a pressure-receiving protrusion 30*b*. The pressure-receiving protrusion 30*b* protrudes toward the outside of the housing 1 from a surface located on the other side of the first protrusion 30 in the first direction. That is, the pressure-receiving protrusion 30 protrudes in a direction away from the housing 1. During a drum roller separation process, the pressure-receiving protrusion 30*b* contacts a first separation lever 112 of the photosensitive drum cartridge, and an image forming apparatus applies a driving force to the first separation lever 112 of the photosensitive drum cartridge, thereby causing the separation lever 112 to contact the pressure-receiving protrusion 30*b* and apply a force to the pressure-receiving protrusion 30*b*, so that the developing cartridge A moves away from the photosensitive drum 100 to achieve the separation of the developer roller 2 and the photosensitive drum 100. The first protrusion 30 further includes a first urged protrusion 30*c*, and the first urged protrusion 30*c* contacts a first pressing component 113 of the photosensitive drum cartridge B to receive an urging force and keep the developer roller 2 in pressure contact with the photosensitive drum 100. The first protrusion 30 further includes a first bearing portion 30*d*, and the first bearing portion 30*d* rotatably supports the developer roller shaft 2*a*. As shown in FIGS. 3 and 12, the first protrusion 30 is located at the front end of the input gear 21, and the first urged protrusion 30*c* is located at the front end of the rotational axis of the input gear 21. Specifically, as shown in FIGS. 20 and 21, the first urged protrusion 30*c* is located between the rotational axis of the input gear 21 and the first protrusion 30, which can better balance a rotational force of the input gear 21, an urging force received by the first urged protrusion 30*c*, and a force received by the first protrusion 30, so that the stability of the urging force received by the first urged protrusion 30*c* can be maintained.

The second protrusion 40 is located at the second outer surface 102. The second protrusion 40 is opposite to and spaced apart from the first protrusion 30 in the first direction. When projected along the first direction, at least a part of the second protrusion 40 overlaps at least a part of the first protrusion 30. The second protrusion 40 includes a second bearing portion 40*a* that rotatably supports the other end of the developer roller shaft 2*a* in the first direction. The second bearing portion 40*a* overlaps the side wall of the housing 1. In other words, a part of the second bearing 40*a* extends from the second outer surface 102 toward the inside of the housing 1. The second protrusion 40 further includes a second guide protrusion 40*b*. The second guide protrusion 40*b* cooperates with a second guide support portion (not shown in the figures) of the photosensitive drum cartridge B to guide the development cartridge A for installation. In the first direction, the second guide protrusion 40*b* is opposite to the first guide protrusion 30*d*. The second protrusion 40 is made of conductive resin material. The second protrusion 40 also serves as an electrode of the developing cartridge A for receiving power from the image forming device and transmitting the power to the developer roller shaft 2*a*. The second protrusion 40 further includes a second urged protrusion 40*c*, and the second urged protrusion 40*c* contacts a second pressing component 114 of the photosensitive drum cartridge B to receive an urging force and keep the developer roller 2 in pressure contact with the photosensitive drum 100. In order to maintain the stability of the second protrusion 40 in receiving a pressing force, the second protrusion 40 is fixedly mounted on the housing 1. The second pressing component 114 of the photosensitive drum cartridge B is made of conductive material. Power components in the image forming device are electrically connected to a spring 115 connected to the second pressing component 114 of the photosensitive drum cartridge B and the second protrusion 40 through the pressing component 114.

Figure 17:
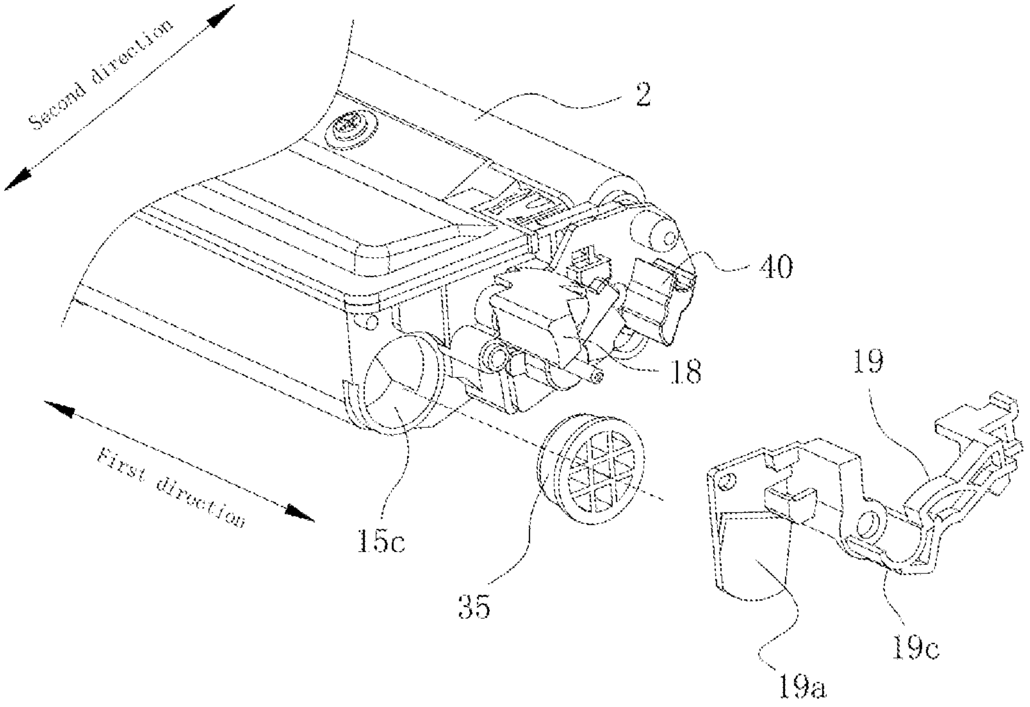
FIG. 17 is a schematic structural view of the developing cartridge provided by the present application in which the side cover and a sealing cover on the second outer surface side are separated.
Figure 18:
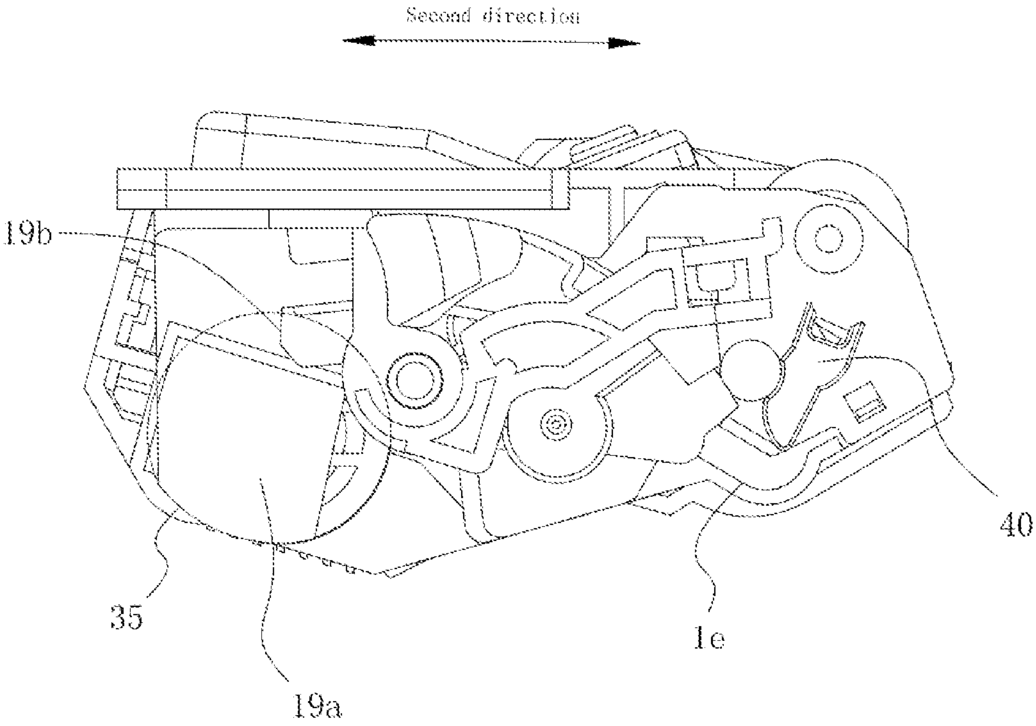
FIG. 18 is a schematic structural view of the developing cartridge provided by the present application viewed along the first direction from the second outer surface side.
Figure 19:
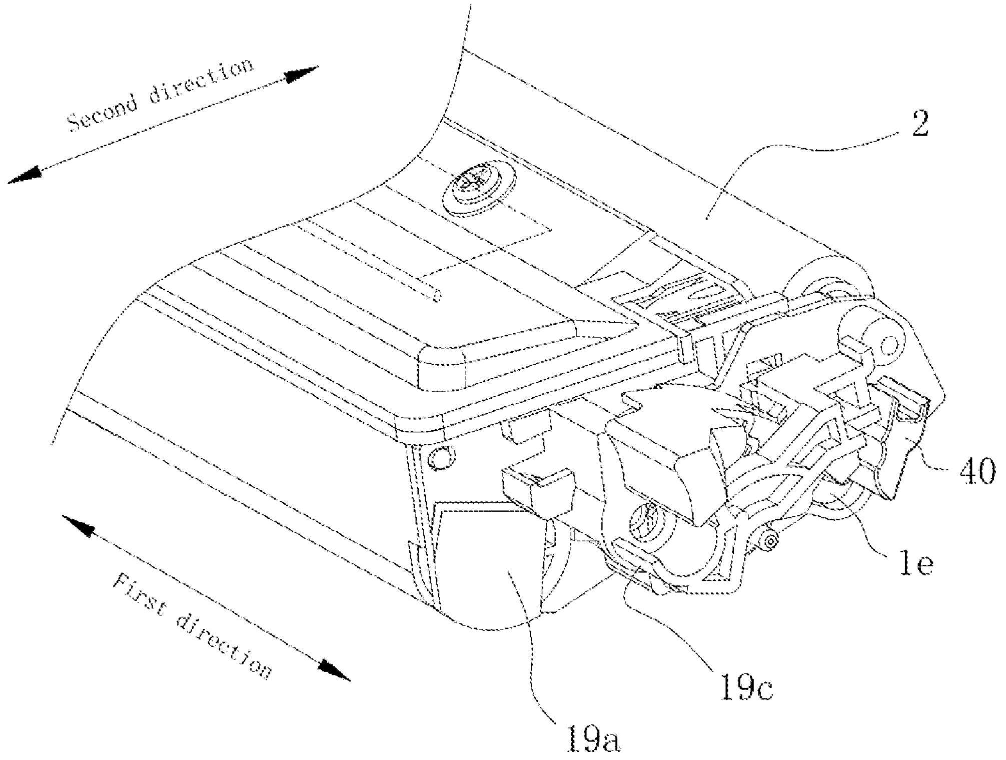
FIG. 19 is a partial structural schematic view of the second outer surface side of the developing cartridge provided by the present application.

A lever 18 is located at the second outer surface 102. A support column 1*d* is formed on the second outer surface 102 of the housing 1. The lever 18 has a circular groove 18*a* that matches the support column 1*d*. The size of the circular groove 18*a* is larger than the size of the support column 1*d*. A force-applying protrusion 18*b* and a protruding column 18*c* serving as a pivot point are further formed on the lever 18. In the first direction, the circular groove 18*a* and the force-applying protrusion 18*b* are located on one side of the lever, and the protruding column 18*c* is located on the opposite side of the lever 18. Further, in the first direction, the protruding column 18*c* protrudes from the opposite side of the circular groove 18*a*. The lever 18 is movably mounted on the second outer surface 102, and a side cover 19 is mounted on the outside of the lever 18 to prevent the lever 18 from falling off. The housing 1 is further provided with a groove if that accommodates the force-applying protrusion 18*b*. The groove if is surrounded by the second protrusion 40 and a side wall of the housing 1 on the second side. The housing 1 has a protruding rib 1*e* formed at the groove if, and a pressure-receiving portion (force receiving surface) 18*d* is provided on the lever 18. During the process of drum roller separation, the image forming device applies a driving force F to the pressure-receiving portion 18*d* to force the lever 18 to pivot around the protruding column 18*c* as a fulcrum, and at the same time, the force-applying protrusion 18*b* exerts force on the protruding rib 1*e*, so that the developing cartridge A moves relative to the photosensitive drum cartridge B to achieve drum roller separation. The side cover 19 is mounted on the housing 1 through fixing components such as screws. The side cover 19 further has a locked protrusion 19*b* formed thereon. When the developing cartridge A is mounted in the photosensitive drum cartridge B, the locked protrusion 19*b* may be limited by a locking lever (not shown in the figures) of the photosensitive drum cartridge B to prevent the developing cartridge A from coming out of the photosensitive drum cartridge B. The side cover 19 further has a raised protrusion 19*c* formed thereon. When the developing cartridge A is mounted in the photosensitive drum cartridge B and the locking lever is turned, the locking lever can pry up the developing cartridge A by contacting the raised protrusion 19*c*. As shown in FIGS. 17-19, the locked protrusion 19*b* is disposed at the rear end of the housing 1 in the second direction, and at least part of the lever 18 is disposed at the front end of the locked protrusion 19*b*. Specifically, at least a part of the lever 18 is disposed closer to the front end of the housing 1 (or the developer roller 2) than the locked protrusion 19*b* in the second direction. The pressure-receiving portion 18*d* of the lever 18 is disposed closer to the front end of the housing 1 than the locked protrusion 19*b*, preventing the pressure-receiving portion 18*d* of the lever 18 and the locked protrusion 19*b* from interfering with each other in the second direction.

The developer accommodating chamber 15 of the developing cartridge A is generally in the form of an elongated box-shaped structure. Therefore, a developer filling port 15*c* is provided on a side wall of one end of the developer accommodating chamber 15 in the first direction. The developing cartridge A is placed vertically along the direction of gravity, and the developer may be filled into the developer accommodating chamber 15 from top to bottom through the developer filling port 15*c*. A required amount of developer can be filled in one canning operation. If the developer filling port 15*c* is not provided on the side wall in the first direction, for example, on the top or bottom wall of the developer accommodating chamber 15, when the developer is filled, and the first direction of the developing cartridge A is placed vertically in the direction of gravity, compared with the way the developer filling port 15*c* is provided on the side wall, there will be a part of the space in the first direction of the developing cartridge A that cannot be filled with developer (the developer cannot be filled at the position overlapping the developer filling port in the first direction). If the first direction of the developing cartridge A is placed along a direction perpendicular to the direction of gravity, the developer will easily be accumulated on one side in the first direction when filling the space of the developer accommodating chamber 15, resulting in filling that is not full. Although other placement angles may also be used to achieve the filling of the developer, it is preferable to provide a developer filling port 15*c* on the side wall of one side of the developer accommodating chamber 15 in the first direction, which is significant for improving developer filling efficiency. A gear is arranged on the first side wall 15*a* of the developer accommodating chamber 15. Therefore, the developer filling port 15*c* is preferably provided on the second side wall 15*b* of the developer accommodating chamber 15. Preferably, in the second direction, the developer filling port 15*c* is located at the rear end of the housing 1 opposite to the front end where the developer roller 2 is located.

A sealing cover 35 is mounted on the developer filling port 15*c* to prevent the developer from leaking from the developer accommodating chamber 15. Specifically, the sealing cover 35 is a circular cover and is in interference fit with the inner wall of the developer filling port 15*c*. The side cover 19 has a covering portion 19*a* covering the sealing cover 35 to prevent the sealing cover 35 from coming off due to vibrations, impacts and the like during transportation of the developing cartridge A. In order to make the size of the developing cartridge A on the second outer surface 102 side along the second direction as small as possible, when projected along the first direction, at least a part of the locked protrusion 19*b* overlaps a part of the sealing cover 35, and in addition, at least a part of the lever 18 overlaps at least a part of the sealing cover 35.

Next, other structures of the developing cartridge A of the present application will be further introduced. As shown in FIGS. 24 to 27, the housing 1 of the developing cartridge A comprises a doctor blade mounting portion 1*a* and a reinforcing metal frame mounting portion 1*b* at positions adjacent to the developer roller 2. An example is that the doctor blade mounting portion 1*a* and the reinforcing metal frame mounting portion 1*b* are two adjacent surfaces of the housing 1. A reinforcing metal frame 37 is made of metal and is fixed to the reinforcing metal frame mounting portion 1*b* by screws, is used to enhance the local strength of the plastic housing 1 here, and can reduce the deformation of the housing 1 here. A doctor blade 36 is mounted on the doctor blade mounting portion 1*a* of the housing 1 through screws. The doctor blade 36 and the reinforcing metal frame 37 are two separate components, and one edge of the reinforcing metal frame 37 is close to one edge of the doctor blade 36. In other words, the reinforcing metal frame 37 and the doctor blade 36 form an approximately right angle after being fixed on the housing 1. The doctor blade 36 includes a blade holder 3601, a blade 3602, a back rubber strip 3603 and a top rubber strip 3604. The blade 3602 is welded to the blade holder 3601 to be supported by the blade holder 3601. The blade 3602 is an elastic metal sheet. The blade 3602 is welded to one end of the blade holder 3601, which is referred to as a fixed end of the blade 3602. A free end of the blade 3602 opposite to the fixed end comprises the top rubber strip 3604 and the back rubber strip 3603. The top rubber strip 3604 is in contact with the outer surface of the developer roller 2 to limit the thickness of the developer layer on the surface of the developer roller 2. In the thickness direction of the blade 3602, the other side opposite to the side of the blade 3602 provided with the top rubber strip 3604 comprises the back rubber strip 3603. The back rubber strip 3603 and the top rubber strip 3604 are arranged oppositely in the thickness direction of the blade 3602. The back rubber strip 3603 and the top rubber strip 3604 are jointly attached to the free end of the blade 3602 so that the local deformation of the blade 3602 at the free end can be improved. In the first direction, one end of the holder 3601 comprises a lug portion 3601*a*, and the lug portion 3601*a* laterally protrudes from a main body portion of the blade holder 3601 along the first direction. The bearing component 16 comprises a limiting hole 16*c*, a developer roller bearing 16*d* and a supply roller bearing 16*e*. The developer roller shaft 2*a* is inserted into the developer roller bearing 16*d*, and may be rotatably supported by the developer roller bearing 16*d*. The supply roller shaft 3*a* is inserted into the supply roller bearing 16*e*, and may be rotatably supported by the supply roller bearing 16*e*. The lug portion 3601*a* is inserted into the limiting hole 16*c* to limit the position of the doctor blade 36 relative to the developer roller 2. Specifically, on a side of the doctor blade 36 close to the bearing component 16, a developer roller bearing 16*d* and a limiting hole 16*c* are simultaneously provided on the bearing component 16 so that the relative movement between the doctor blade 36 and the developer roller 2 can be limited, thereby improving the ability of the doctor blade 36 to adjust the thickness of the developer layer on the surface of the developer roller 2.

An anti-slip area is provided on the outer wall of the developer accommodating chamber 15 of the developing cartridge A. Specifically, a plurality of strip ribs 1501 and strip grooves 1502 are provided on the top wall 15*d* of the developer accommodating chamber 15, and a plurality of strip ribs 1503 and strip grooves 1504 are also provided at positions opposite to the bottom wall 15*e* of the developer accommodating chamber 15 opposite to the top wall 15*d*. The above strip ribs 1501/1503 and strip grooves 1502/1504 form the anti-slip area on the outer wall of the developer accommodating chamber 15. A user can grab the anti-slip areas provided on the top wall 15*d* and the bottom wall 15*e* to grasp the developing cartridge A, that is, the anti-slip area on the top wall 15*d* and the bottom wall 15*e* of the developer accommodating chamber 15 forms a handle for the user to grasp the developing cartridge A. In addition, the frame of the photosensitive drum cartridge B comprises an avoidance structure to avoid the anti-slip area of the bottom wall 15*e* of the developing cartridge A. That is to say, when the developing cartridge A is mounted on the photosensitive drum cartridge B, the strip ribs 1503 and strip grooves 1504 on the bottom wall 15*e* are exposed to allow the user to grasp the developing cartridge A.

Figure 13:
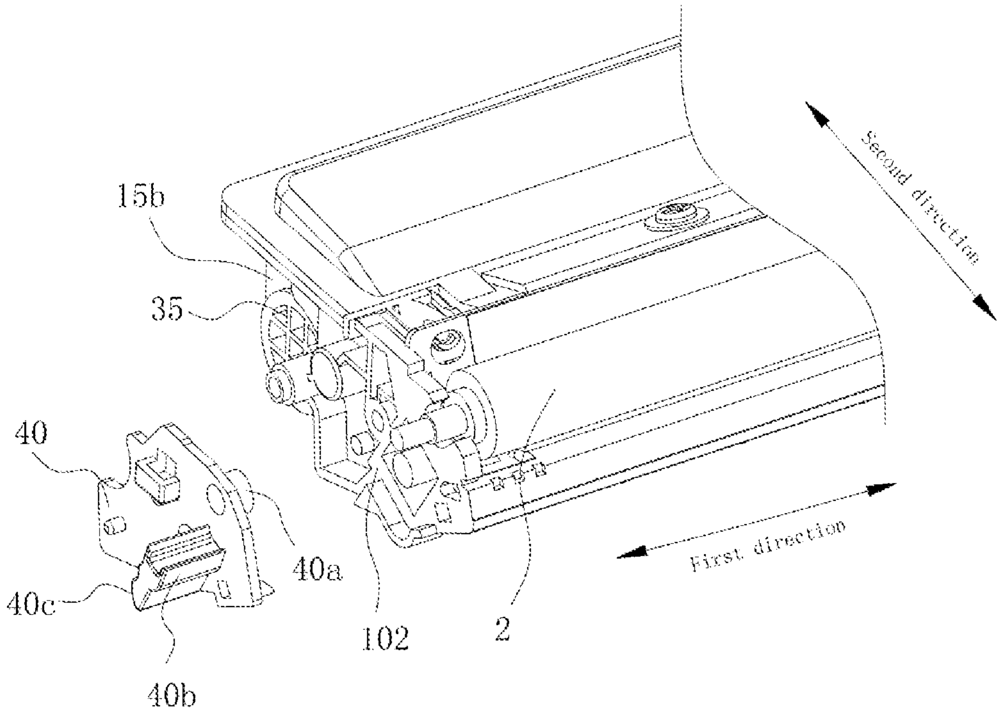
FIG. 13 is a schematic structural view of the developing cartridge provided by the present application in which the second protrusion on the second outer surface side is separated.
Figure 14:
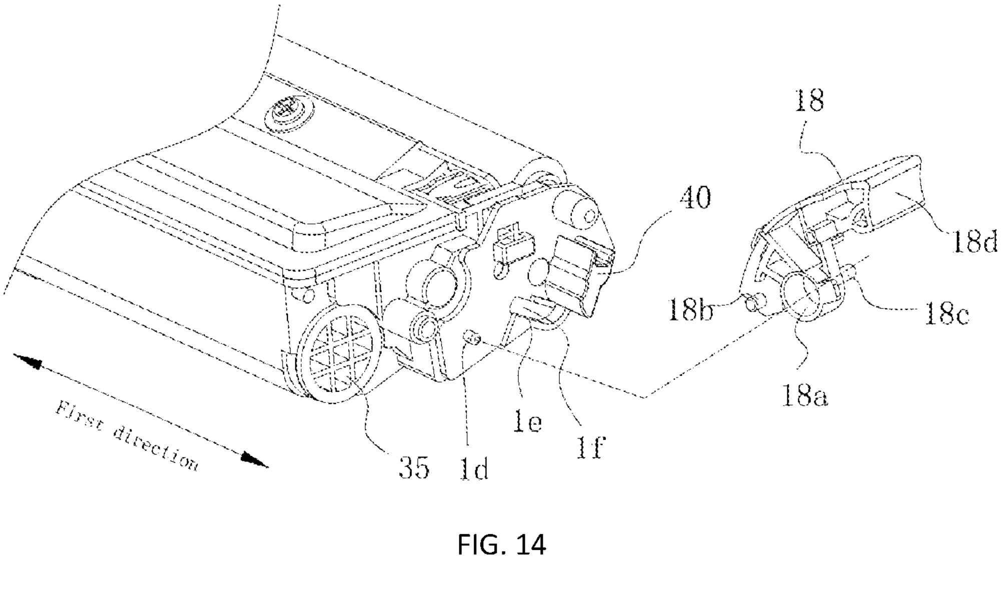
FIG. 14 is a schematic structural view of the developing cartridge provided by the present application in which a lever on the second outer surface side is separated.
Figure 15:
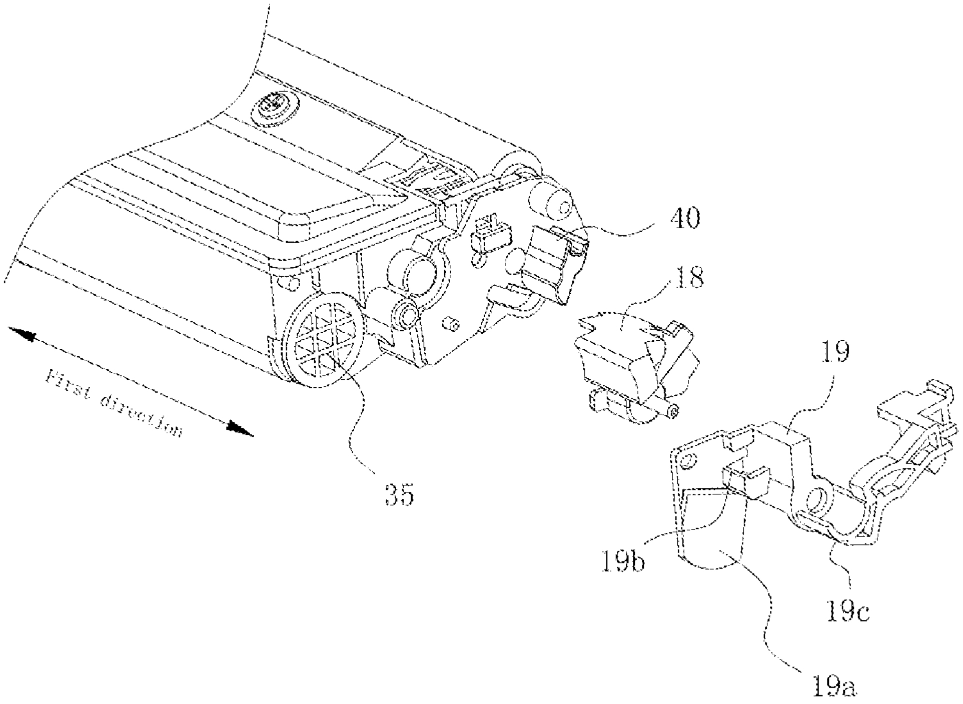
FIG. 15 is a schematic structural view of the developing cartridge provided by the present application in which the lever and a side cover on the second outer surface side are separated.
Figure 16:
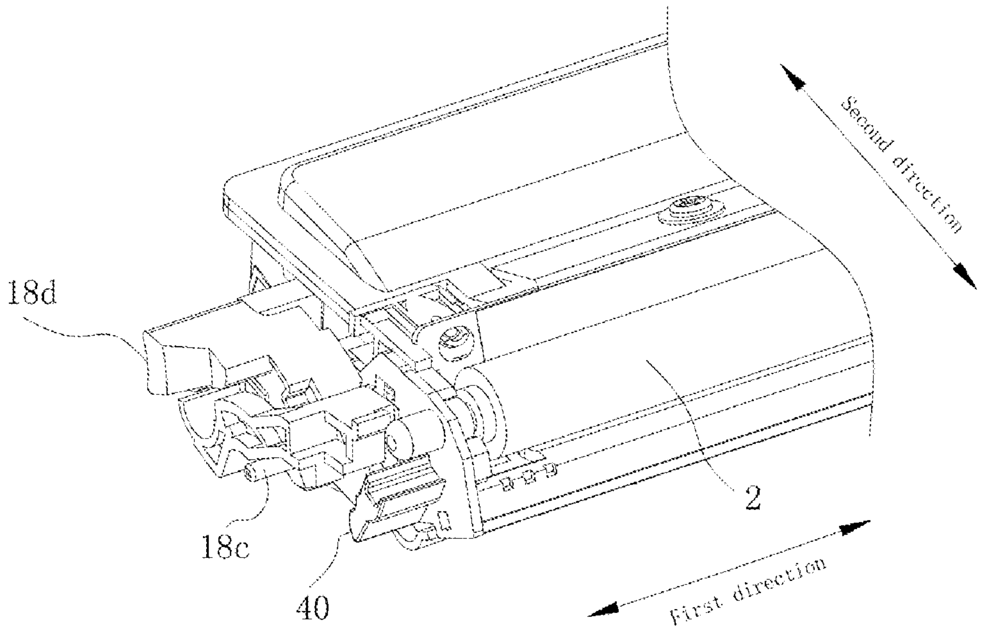
FIG. 16 is a partial structural schematic view of the second outer surface side of the developing cartridge provided by the present application.
Figure 28:
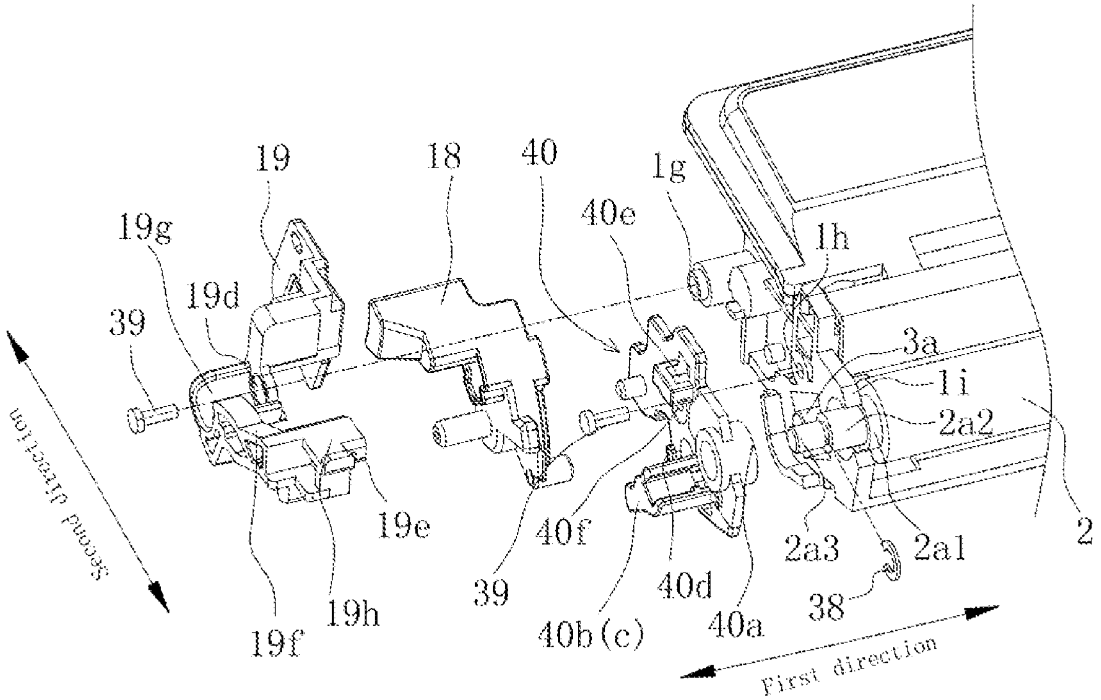
FIG. 28 is an exploded structural schematic view of the second outer surface side of the developing cartridge provided by the present application.
Figure 29:
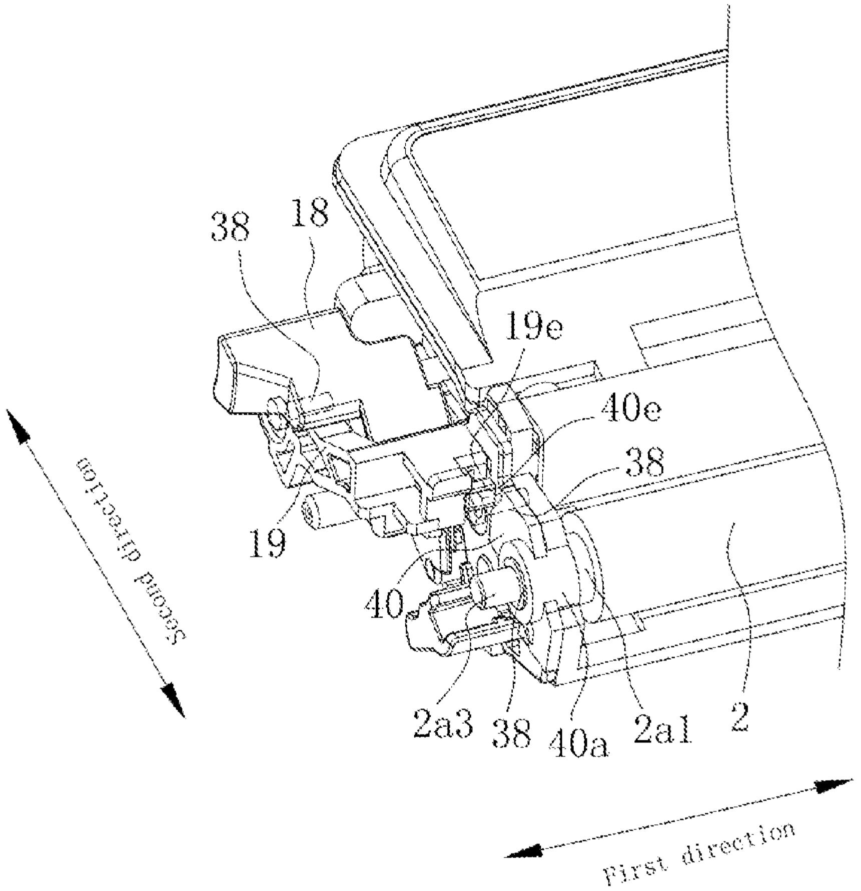
FIG. 29 is a partial structural schematic view of the second outer surface side of the developing cartridge provided by the present application.

As shown in FIGS. 28 and 29, the second protrusion 40 of the developing cartridge A is also configured as an electrode 40 on the developing cartridge A that is electrically connected to the developer roller shaft 2*a*, and the electrode 40 is mounted on a side in which the second outer surface 102 of the housing 1 is located (see FIG. 13). The electrode 40 is fastened to the second outer surface 102 of the housing 1 through screws 39. An example of the screw 39 is a self-tapping screw. However, this is not limiting, and machine screws, set screws and the like may also be used. Specifically, the housing 1 comprises a screw fixing hole 1*h*, the electrode 40 comprises a screw hole 40*f*, a threaded part of the screw 39 passes through the screw hole 40*f* and is tightened on the screw fixing hole 1*h*, and the electrode 40 is fastened to the housing 1 by a nut part of the screw 39. In the first direction, the lever 18 is movably located between the side cover 19 and the electrode 40 or the housing 1. In other words, the side cover 19 and the electrode 40 or the housing 1 movably retain the lever 18. The electrode 40 comprises a side cover limiting groove 40*e* at a position close to the screw hole 40*f*. The side cover 19 comprises a limited protrusion 19*e* that can be inserted into the side cover limiting groove 40*e*. The limited protrusion 19*e* of the side cover 19 is inserted into the limiting groove 40*e* to prevent the limited protrusion 19*e* from coming out of the electrode 40 in the first direction. The side cover limiting groove 40*e* is provided close to the screw hole 40*f*, which can inhibit the electrode 40 from being detached from the side cover limiting groove 40*e* due to its own deformation and other reasons, that is to say, the side cover 19 can well be prevented from coming out of the side cover limiting groove 40*e*. In the second direction, a screw hole 19*d* is provided on the side cover 19 at a different position from the limited protrusion 19*e*. The threaded part of the screw 39 passes through the screw hole 19*d* and is tightened on a screw fixing hole 1*g* of the housing 1, and the side cover 19 is fastened to the housing 1 by the nut part of the screw 39. The side cover 19 has a bridge-shaped connecting portion 19*f* connecting the screw hole 19*d* and the limited protrusion 19*e*. In other words, the screw hole 19*d*, the limited protrusion 19*e* and the bridge-shaped connecting portion 19*f* are connected to form a bridge-shaped portion. Specifically, a first column 19*g* extending in the first direction is formed at a position on the side cover 19 near the screw hole 19*d*, and a second column 19*h* extending in the first direction is formed at a position on the side cover 19 near the limited protrusion 19*e*. The first column 19*g* and the second column 19*h* form two supporting columns of the bridge-shaped portion, and the bridge-shaped connecting portion 19*f* connects the first column 19*g* and the second column 19*h* to form the bridge-shaped portion. A part of the lever 18 is inserted into a bridge space surrounded by the first column 19*g*, the second column 19*h* and the bridge-shaped connection portion 19*f*. The first column 19*g* and the second column 19*h* are located on both sides of the lever 18, respectively, and are arranged oppositely. The movement of the lever 18 in the second direction can be limited by the first column 19*g* and the second column 19*h*, and the movement of the lever 18 in the first direction can be limited by the bridge-shaped connection portion 19*f* and the electrode 40 or the housing 1. Thus, lever 18 is effectively maintained and is movable. The connecting screw hole 19*d* and the limited protrusion 19*e* are located on both sides of the lever 18, respectively, and are arranged oppositely, so that the lever 18 may not be detached from the side cover 19 and the electrode 40 or the housing 1 in the first direction.

Referring to FIGS. 28 and 29, the electrode 40 is also provided with a second bearing portion 40*a* as a developer roller bearing, a third bearing portion 40*d* as a supply roller bearing, a second guide protrusion 40*b* and a second urged protrusion 40*c*, wherein the second guide protrusion 40*b* and the second urged protrusion 40*c* are an integral protrusion extending along the first direction. Making the second guide protrusion 40*b* and the second urged protrusion 40*c* into an integral protrusion can not only reduce the number of parts of the developing cartridge, and but also enhance the structural strength of the second guide protrusion 40*b* and the second urged protrusion 40*c*. On the side where the second outer surface 102 (see FIG. 13) of the housing 1 is located, the developer roller shaft 2*a* has a plurality of parts of different diameters, specifically, a first diameter part 2*a*1, a second diameter part 2*a*2 and a third diameter part 2*a*3. The first diameter part 2*a*1, the second diameter part 2*a*2 and the third diameter part 2*a*3 are arranged in sequence in the first direction, and have diameters decreased in sequence, wherein the third diameter part 2*a*3 has the smallest diameter, and the first diameter part 2*a*1 has the largest diameter. The second bearing portion 40*a* is inserted into the second diameter part 2*a*2 to support the developer roller shaft 2*a*. A support hole of the second bearing portion 40*a* has a diameter larger than the diameter of the third diameter part 2*a*3 and smaller than the diameter of the first diameter part 2*a*1. The third diameter part 2*a*3 comprises a circlip mounting groove, and the circlip 38 is mounted on the circlip mounting groove. In the first direction, the circlip 38 is mounted on the outside of the second bearing portion 40*a* of the electrode 40, and a side of the second bearing portion 40*a* opposite to the side where the circlip 38 is located is opposite to the first diameter part 2*a*1. The first diameter part 2*a*1 and the third diameter part 2*a*3 are located on both sides of the side wall 1*i* of the housing 1 in the first direction, respectively. In the first direction, the side wall 1*i* overlaps the second diameter part 2*a*1, and the second bearing portion 40*a* is supported by the side wall 1*i*. At the same time, in the first direction, the movement of the developer roller 2 from the first outer surface 101 (see FIG. 7) to the second outer surface 102 of the housing 1 is limited by the contact between the first diameter part 2*a*1 and the second bearing portion 40*a*, and the movement of the developer roller 2 from the second outer surface 102 to the first outer surface 101 of the housing 1 is limited by the contact between the circlip 38 mounted on the developer roller shaft 2*a* and the second bearing portion 40*a*.

The above embodiments are only used to illustrate the technical solutions of the present application, but are not intended to limit them. Although the present application has been described in detail with reference to the foregoing embodiments, those of ordinary skill in the art should understand that they can still modify the technical solutions described in the foregoing embodiments, or make equivalent substitutions for some of the technical features. However, these modifications or substitutions shall not cause the essence of the corresponding technical solutions to deviate from the spirit and scope of the technical solutions of the embodiments of the present application.

What is claimed is:

1. A developing cartridge, comprising:

a housing;

a developer roller extending in a first direction and at a front end of the housing in a second direction intersecting the first direction;

an agitator;

an input gear at a first end of the housing in the first direction;

a developer roller gear at one end of the developer roller and configured to cause the developer roller to rotate;

an agitator gear at one end of the agitator and configured to cause the agitator to rotate;

at least two transmission gears connected between the input gear and the developer roller gear, wherein one of the at least two transmission gears contacts and meshes with the input gear;

an agitator transmission gear is configured to transmit driving force to the agitator gear, wherein the agitator transmission gear contacts and meshes with the input gear, and in the second direction, a rotational axis of the agitator gear is located between a rotational axis of the agitator transmission gear and a rotational axis of the input gear.

2. The developing cartridge according to claim 1, wherein the input gear covers at least a part of the agitator gear when viewed in the first direction.

3. The developing cartridge according to claim 1, wherein in the second direction, a rotational axis of the developer roller gear, a rotational axis of one of the at least two transmission gears, a rotational axis of the input gear, a rotational axis of the agitator gear, and a rotational axis of the agitator transmission gear are arranged in sequence.

4. The developing cartridge according to claim 1, wherein the number of the at least two transmission gears is an even number.

5. The developing cartridge according to claim 1, further comprising a first bearing component at the first end of the housing, wherein the first bearing component rotatably supports the developer roller, and the first bearing component comprises an input gear support column that supports the input gear and a support column that supports one of the at least two transmission gears.

6. The developing cartridge according to claim 1, further comprising a supply roller, wherein one of the at least two transmission gears is at an end of the supply roller and configured to cause the supply roller to rotate, and another transmission gear of the at least two transmission gears meshes with the developer roller gear.

7. The developing cartridge according to claim 1, further comprising a first protrusion at the first end and a gear cover covering at least a part of the input gear, wherein the first protrusion is configured to receive force from a photosensitive drum cartridge and cause the developer roller to move in a direction away from a photosensitive drum of the photosensitive drum cartridge, and wherein an orthographic projection of the first protrusion in the first direction overlaps at least a part of an orthographic projection of the developer roller gear in the first direction.

8. The developing cartridge according to claim 7, wherein the first protrusion and the gear cover are formed integrally with each other by coinjection molding.

9. The developing cartridge according to claim 1, further comprising a chip unit at the first end of the housing in the first direction, and the chip unit is farther to the front end of the housing than the rotational axis of the agitator gear in the second direction.

10. The developing cartridge according to claim 9, wherein the chip unit comprises a chip and a chip holder supporting the chip, and the chip holder is movable and on the first end of the housing.

11. The developing cartridge according to claim 1, wherein the developer roller comprises a developer roller shaft, the developer roller shaft has a first diameter part, a second diameter part and a third diameter part, and wherein the first diameter part, the second diameter part and the third diameter part are arranged in sequence in the first direction, and have diameters decreasing in sequence.

12. The developing cartridge according to claim 11, wherein the housing further comprises a second end opposite to the first end in the first direction, wherein the developing cartridge further comprises a second bearing component at the second end of the housing, wherein the second bearing component rotatably supports the development roller shaft, and wherein the second bearing component supports the second diameter part to support the development roller shaft.

13. A developing cartridge, comprising:

a housing;

a developer roller extending in a first direction and at a front end of the housing in a second direction intersecting the first direction;

an agitator;

an input gear at a first end of the housing in the first direction;

a developer roller gear at one end of the developer roller and configured to cause the developer roller to rotate;

an agitator gear at one end of the agitator and configured to cause the agitator to rotate;

at least two transmission gears connected between the input gear and the developer roller gear, wherein one of the at least two transmission gears contacts and meshes with the input gear;

a lever at a second end opposite to the first end of the housing in the first direction, the lever being movable relative to the housing; and a locked protrusion at the second end in the first direction, the locked protrusion being configured to allow a photosensitive drum cartridge to lock the developing cartridge;

wherein at least a part of the lever is closer to the front end of the housing than the locked protrusion in the second direction.

14. The developing cartridge according to claim 13, further comprising an electrode and a side cover, wherein the electrode is electrically connected to the developer roller, the electrode is at the second end of the housing, the side cover is mounted on an outer side of the lever to prevent the lever from coming out of the housing, the electrode comprises a side cover limiting groove, and the side cover comprises a limited protrusion configured to be inserted into the side cover limiting groove.

15. The developing cartridge according to claim 13, wherein the housing comprises a developer accommodating chamber, wherein the developer accommodating chamber comprises a first side wall and a second side wall opposite to the first side wall in the first direction, wherein the first side wall is at the first end of the housing, wherein a developer filling port is on the second side wall, wherein a sealing cover is mounted on the powder filling port and configured to prevent developer from leaking from the developer accommodating chamber, and wherein an orthographic projection of at least a part of the locked protrusion in the first direction overlaps at least a part of an orthographic projection of the sealing cover in the first direction.

16. The developing cartridge according to claim 13, further comprising a first protrusion at the first end, wherein the first protrusion is configured to receive force from the photosensitive drum cartridge and cause the developer roller to move in a direction away from a photosensitive drum of the photosensitive drum cartridge, and wherein an orthographic projection of the first protrusion in the first direction overlaps at least a part of an orthographic projection of the developer roller gear in the first direction.

17. The developing cartridge according to claim 16, further comprising a second protrusion on the second end of the housing, wherein the second protrusion is electrically connected to the developer roller, and wherein at least a part of an orthographic projection of the second protrusion in the first direction overlaps at least a part of an orthographic projection of the first protrusion in the first direction.

18. The developing cartridge according to claim 13, further comprising a first urged protrusion at the first end, wherein the first urged protrusion is configured to contact a pressing component of the photosensitive drum cartridge to receive an urging force to keep the developer roller in contact with a photosensitive drum of the photosensitive drum cartridge, and the first urged protrusion is located at a front end of a rotational axis of the input gear in the second direction.

19. The developing cartridge according to claim 18, further comprising a gear cover at the first end, wherein the gear cover is configured to cover at least a part of the input gear, and the first urged protrusion and the gear cover are formed integrally with each other by coinjection molding.

20. A developing cartridge, comprising:

a housing;

a developer roller extending in a first direction and at a front end of the housing in a second direction intersecting the first direction;

an agitator;

an input gear at a first end of the housing in the first direction;

a developer roller gear at one end of the developer roller and configured to cause the developer roller to rotate; and an agitator gear at one end of the agitator and configured to cause the agitator to rotate;

at least two transmission gears connected between the input gear and the developer roller gear, wherein one of the at least two transmission gears contacts and meshes with the input gear; and a first urged protrusion that contacts a pressing component of a photosensitive drum cartridge to receive an urging force to keep the developer roller in contact with a photosensitive drum of the photosensitive drum cartridge, and wherein the first urged protrusion is closer to the front end of the housing than a rotational axis of the input gear in the second direction.

21. The developing cartridge according to claim 20, further comprising a gear cover at the first end, wherein the gear cover is configured to cover at least a part of the input gear, and the first urged protrusion and the gear cover are formed integrally with each other by coinjection molding.

22. The developing cartridge according to claim 20, further comprising a first protrusion at the first end, wherein the first protrusion is configured to receive force from the photosensitive drum cartridge and cause the developer roller to move in a direction away from the photosensitive drum, and wherein an orthographic projection of the first protrusion in the first direction overlaps at least a part of an orthographic projection of the developer roller gear in the first direction.

23. The developing cartridge according to claim 22, wherein the housing further comprises a second end opposite to the first end in the first direction, wherein the developing cartridge further comprises a second protrusion on the second end of the housing, wherein the second protrusion is electrically connected to the developer roller, and wherein at least a part of an orthographic projection of the second protrusion in the first direction overlaps at least a part of an orthographic projection of the first protrusion in the first direction.

24. The developing cartridge according to claim 22, further comprising a gear cover at the first end, wherein the gear cover is configured to cover at least a part of the input gear, and wherein the first urged protrusion, the first protrusion and the gear cover are formed integrally with each other by coinjection molding.

25. The developing cartridge according to claim 22, wherein the first protrusion is on an outer side of the first urged protrusion in the first direction.

26. The developing cartridge according to claim 22, wherein the first urged protrusion is between the first protrusion and a rotational axis of the input gear in the second direction.

27. The developing cartridge according to claim 26, further comprising a bearing component and a doctor blade, wherein the bearing component comprises a limiting cavity and a developer roller bearing that rotatably supports the developer roller, wherein the doctor blade comprises a blade and a blade holder that supports the blade, and wherein, in the first direction, the blade holder comprises a lug portion configured to be inserted into the limiting cavity.

* * * * *